(12) United States Patent
Miranda Artacho et al.

(10) Patent No.: US 12,217,457 B1
(45) Date of Patent: Feb. 4, 2025

(54) DETERMINING A LOCATION OF A MOBILE CART

(71) Applicant: Amazon Technologies, Inc., Seattle, WA (US)

(72) Inventors: Bruno Miranda Artacho, Arlington, VA (US); Vinod Krishnan Kulathumani, Westborough, MA (US); Sreemanananth Sadanand, Shrewsbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 405 days.

(21) Appl. No.: 17/490,446

(22) Filed: Sep. 30, 2021

(51) Int. Cl.
| | |
|---|---|
| *G06T 7/73* | (2017.01) |
| *G06F 18/20* | (2023.01) |
| *G06F 18/214* | (2023.01) |
| *G06V 10/70* | (2022.01) |
| *G06V 30/19* | (2022.01) |

(52) U.S. Cl.
CPC .............. *G06T 7/75* (2017.01); *G06F 18/214* (2023.01); *G06F 18/285* (2023.01); *G06V 10/768* (2022.01); *G06T 2207/20081* (2013.01); *G06V 30/19153* (2022.01)

(58) Field of Classification Search
None
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,127,438 B1 | 11/2018 | Fisher et al. | |
| 10,133,933 B1 | 11/2018 | Fisher et al. | |
| 10,540,378 B1 * | 1/2020 | Hsiao | G06F 18/24 |
| 10,726,379 B1 * | 7/2020 | Donnelly | G06Q 10/083 |
| 2009/0138375 A1 * | 5/2009 | Schwartz | G06Q 30/0601 |
| | | | 705/26.1 |

(Continued)

OTHER PUBLICATIONS

Paolanti M, Romeo L, Martini M, Mancini A, Frontoni E, Zingaretti P. Robotic retail surveying by deep learning visual and textual data. Robotics and Autonomous Systems. Aug. 1, 2019;118:179-88. (Year: 2019).*

(Continued)

*Primary Examiner* — Michelle M Entezari Hausmann
(74) *Attorney, Agent, or Firm* — Kilpatrick Townsend & Stockton LLP

(57) ABSTRACT

This disclosure is directed to, in part, mobile carts that are configured to determine their respective locations based on analysis of image data generated by cameras mounted to the respective carts. For instance, an example mobile cart may include at least one camera of a field-of-view directed substantially away from a cart and substantially towards an outward environment of the cart, such as toward an inventory location that houses one or more items. The mobile cart may generate image data representative of items housed at an inventory location adjacent to the cart and may use computer-vision techniques to analyze the image data and determine characteristics of these items. The mobile cart may then use this information to determine which section of multiple sections of a store in which the cart is currently located.

16 Claims, 15 Drawing Sheets

(56) References Cited

U.S. PATENT DOCUMENTS

| | | | |
|---|---|---|---|
| 2009/0192921 A1* | 7/2009 | Hicks | G06Q 10/087 715/764 |
| 2011/0150323 A1* | 6/2011 | Hancock | G06F 18/254 382/224 |
| 2013/0284806 A1 | 10/2013 | Margalit | |
| 2013/0325673 A1* | 12/2013 | Abdic | G06Q 10/087 705/28 |
| 2015/0178565 A1* | 6/2015 | Rivlin | G06T 7/73 348/169 |
| 2015/0317708 A1* | 11/2015 | Eramian | G06Q 30/0605 705/26.8 |
| 2016/0253581 A1* | 9/2016 | Takahashi | G06V 40/10 382/165 |
| 2016/0259341 A1* | 9/2016 | High | H04W 4/80 |
| 2016/0328660 A1* | 11/2016 | Huang | G07G 1/0045 |
| 2017/0178206 A1* | 6/2017 | Lee | G06N 7/01 |
| 2018/0025412 A1* | 1/2018 | Chaubard | G06Q 30/0639 705/26.9 |
| 2019/0138845 A1* | 5/2019 | Lin | G06F 18/2431 |
| 2019/0149725 A1* | 5/2019 | Adato | H04N 1/00 348/158 |
| 2019/0236583 A1* | 8/2019 | Hagen | G06Q 20/047 |
| 2019/0392505 A1* | 12/2019 | Amemura | G06V 30/224 |
| 2020/0293992 A1* | 9/2020 | Bogolea | H04N 7/188 |
| 2021/0182775 A1* | 6/2021 | Dunk | G06F 16/51 |
| 2021/0246631 A1* | 8/2021 | Kurosawa | E02F 9/2004 |
| 2021/0287013 A1* | 9/2021 | Carter | G06T 7/246 |
| 2021/0312206 A1* | 10/2021 | Meidar | G06F 18/23213 |
| 2021/0409648 A1* | 12/2021 | Kallakuri | G06N 20/00 |
| 2023/0237428 A1* | 7/2023 | Francis | G06Q 10/08 705/28 |

OTHER PUBLICATIONS

Paolanti, Marina, et al. "Mobile robot for retail surveying and inventory using visual and textual analysis of monocular pictures based on deep learning." 2017 European conference on mobile robots (ECMR). IEEE, 2017. (Year: 2017).*

* cited by examiner

DETERMINING A LOCATION OF A MOBILE CART

BACKGROUND

Materials handling facilities, such as warehouses or retail stores, often provide users with carts to facilitate the processes by which the users locate, identify, retrieve, and transport items at the facilities. For example, when a user identifies an item that he or she desires on a shelf or other location within a materials handling facility, the user may remove the item from the shelf or other location, and place the item into a receptacle of a cart before the user continues to travel through the facility in search of additional items. The cart may have a durable frame or structure that is configured to travel on wheels such that users are able to fill the carts with numerous, and potentially heavy, items they desire, and use the mobile cart to transport the items around the materials handling facilitate with ease, rather than having to carry the items.

Traditionally, when the user has finished identifying and retrieving the items he or she desires, the user may transport the items in the cart to a check-out destination within the materials handling facility, such as a distribution station, a cashier, or a dedicated self-checkout stand, and transition the items to a human operator or an automated agent. Typically, the user or the human operator manually removes the items from the cart, scans or otherwise registers the items with the user, and places the items into one or more bags or other item carriers. The user may then use the bags or other item carriers to transport the items to another destination (e.g., to an automobile, workstation, or home) by manually carrying the item carriers to the other destination, or by transporting the item carriers to the destination within the cart.

Thus, retrieving items from shelves or other locations within a materials handling facility, and placing the items into bags or other carriers for transportation to their desired destination (e.g., automobile or home), may be a two-step process. First, the items must be retrieved from the shelves or other storage locations and placed into the cart, and second, the items must be removed from the cart, scanned, and placed into a bag or other item carrier. These intervening actions that are required to transition items from a shelf or other storage location into the bags or other item carrier necessarily slows the process by which items are retrieved from a materials handling facility, and tend to mitigate the advantages that carts provide.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
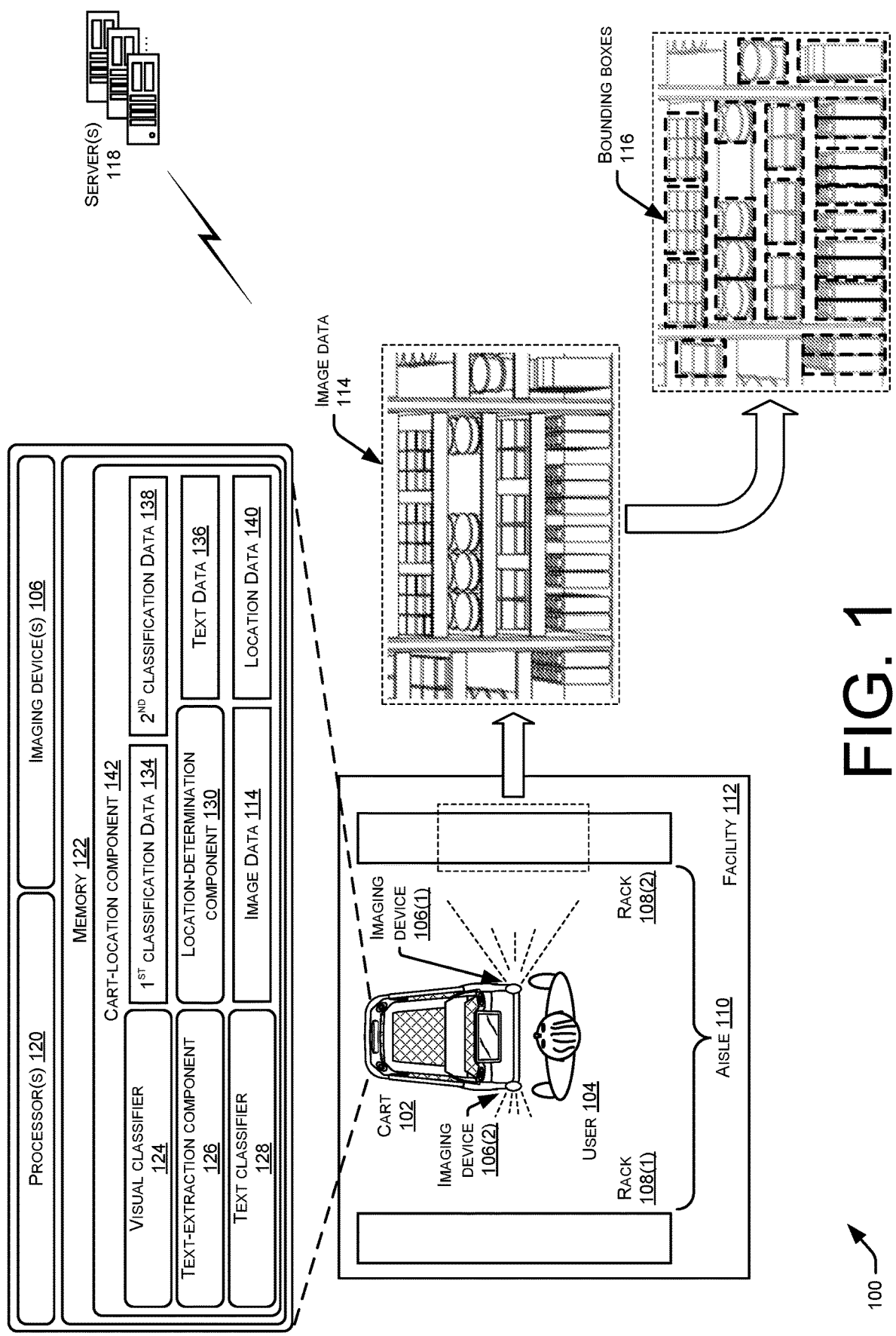
FIG. 1 illustrates an example architecture that includes a user operating a mobile cart in a facility. As illustrated, the mobile cart includes one or more cameras configured to generate image data of an inventory location housing one or more items. The mobile cart and/or one or more servers may analyze the image data to determine, based on characteristics of items represented in the image data, a current location of the mobile cart within the facility.

This disclosure is directed to, in part, mobile carts and/or associated computing devices that are configured to determine respective locations of the carts based on analysis of image data generated by cameras mounted to the respective carts. For instance, an example mobile cart may include at least one camera having a field-of-view directed substantially away from a cart and substantially towards an outward environment of the cart, such as toward an inventory location (e.g., rack, table, etc.) that houses one or more items. In some instances, the cart may be operated in a retail environment and, thus, the camera may generate image data of different retail items housed on the respective inventory locations adjacent to a current location of the cart. Further, while the cart may include one camera, in other instances, the cart may include multiple cameras, each of which may be oriented in a same or different direction. In one example, a cart may have a first camera(s) oriented to the right side of the cart (relative to an axis described by forward motion of the cart), as well as a second camera(s) oriented to a left side of the cart. Thus, each camera may generate image data of inventory locations on the right and left side of the cart, respectively.

In some instances, a camera mounted to a mobile cart may continuously or periodically generate image data, which may represent an inventory location housing one or more items. In response to generating this image data, the mobile cart, or a computing device (e.g., a remote server) communicatively coupled thereto, may analyze the image data to determine a current location of the cart. In some instances, the cart (or other device) utilizes one or more trained classifiers to determine information regarding the items on the inventory location represented in the image data, and may use this information to determine a current location of the cart. For instance, the cart may determine, based on information from the one or more trained classifiers, that the cart is currently located in a certain section of the facility of multiple sections of the facility. In the example of a grocery store, the cart may determine that it is located in one of the following sections in some instances: pasta section, cereal section, dairy section, produce section, snack section, beverage section, deli section, or the like. In a hardware store example, meanwhile, the cart may determine that it is located in one of the following sections in some instances: a power tool section, a fastener section, a lighting section, a plumbing section, a garden section, and so forth. Of course, while a few examples have been given, it is to be appreciated that the cart or other device may be operable in other retail and non-retail environments. Further, it is to be appreciated that the described techniques may be used to localize other apparatuses in addition to mobile carts, such as carry-able baskets, robots, vehicles, and/or the like. Further, while these examples describe one method for localizing the mobile cart, in some instances the cart (or server) may use this information in addition to other information to determine a location of the cart. For instance, the mobile cart may include an upwards-pointing camera to identify unique fiducials printed on the ceiling that are associated with respective locations in the facility, a downwards-point camera to identify unique fiducials printed on the floor that are associated with respective locations in the facility, an RFID reader configured to read RFID tags that are affixed to inventory locations in the facility and associated with respective locations, and so forth.

In some instances described below, the mobile cart or other computing device may analyze the image data using at least a visual classifier configured to identify item categories based on visual characteristics of the image data and a text classifier configured to identify item categories based on text extracted from the image data. For instance, after generating a frame of image data, the mobile cart may input the feature data into the visual classifier, which may generate feature data associated with this image data and analyze this feature data to determine a label(s) associated with the image data and a confidence level(s). As is known, the feature data may comprise any data based on pixel values represented in the image data. The visual classifier, meanwhile, may comprise a classifier trained based on labeled image data to output an indication of which class image data is likely to belong to and a corresponding confidence score. For instance, the visual classifier may be trained, using labeled image data, to output a respective confidence score indicating a likelihood that the image data corresponding to the input feature data corresponds a respective class of "N" classes (where N represents the number of classes that the visual classifier has been trained on).

For instance, using a grocery store as an example, the visual classifier may have been trained using a first set of image data captured in a dairy section of a store and labeled as "dairy," a second set of image data captured in a pasta section of a store and labeled as "pasta," a third set of image data captured in a cereal section of a store and labeled as "cereal," and so forth. After the visual classifier has been trained and the feature data from the example above is input to the visual classifier, the visual classifier may output a respective likelihood or confidence that the image data corresponding to the input feature data corresponds to each respective class. If, for instance, the image data was generated in a pasta section of a store, then the visual classifier may output an indication that there is 94% confidence that the image data should have a label of "pasta," a 2% confidence that the image data should have a label of cereal, a 1% confidence that the image data should have a label of dairy, and so forth. Further, while this example, describes use of a multiclass classifier, it is to be appreciated that the "visual classifier" may comprise a series a single-class classifiers, each configured to receive inputted feature data and output a likelihood that the corresponding image data represents the class on which the respective classifier has been trained. Further, while several examples of trained classifiers are described herein, it is to be appreciated that these techniques may utilize convolutional neural networks, random forest, deep learning, and/or other type(s) of machine learning for classifying the example image data.

After, during, or before the mobile cart has input the feature into the visual classifier, the mobile cart may also input the image data or information associated with the image data to another classifier, such as a text classifier. For instance, the mobile cart may extract text data from the image data and input this text data into the text classifier. That is, the mobile cart may utilize computer-vision techniques to identify strings of text from within the image data and may input this identified text into the text classifier. The text classifier, meanwhile, may comprise a classifier trained based on labeled text data to output an indication of which class image data is likely to belong to and a corresponding confidence score. For instance, the visual classifier may be trained, using labeled text data, to output a respective confidence score indicating a likelihood that the image data corresponding to the input feature data corresponds a respective class of "N" classes (where N represents the number of classes that the text classifier has been trained on).

For instance, and again using a grocery store as an example, the text classifier may have been trained using a first set of words captured in a dairy section of a store and labeled as "dairy" (e.g., milk, yogurt, 2%, butter, etc.), a second set of words captured in a pasta section of a store and labeled as "pasta" (e.g., spaghetti, noodles, penne, pasta, etc.), a third set of image data captured in a cereal section of a store and labeled as "cereal" (e.g., whole grain, flakes, morning, etc.), and so forth. After the text classifier has been trained and the text data from the example above is input to the text classifier, the text classifier may output a respective likelihood or confidence that the text data inputted to the text classifier corresponds to each respective class. If, for instance, the text data was generated in a pasta section of a store, then the visual classifier may output an indication that there is 87% confidence that the image data from which the text data was extracted should have a label of "pasta," a 8% confidence that the image data should have a label of cereal, a 4% confidence that the image data should have a label of dairy, and so forth. Further, while this example, describes use of a multiclass classifier, it is to be appreciated that the "text classifier" may comprise a series a single-class classifiers, each configured to receive inputted text data and output a likelihood that the corresponding image data represents the class on which the respective classifier has been trained.

After the visual classifier has output visual classification data (e.g., comprising respective confidence scores associated with each class) and the text classifier has output text classification data (e.g., comprising respective confidence scores associated with each class), the mobile cart may merge or fuse this classification data together to determine a likely item category represented by the image data. This item category may be used to determine, or may itself represent, a current location of the mobile cart in the facility. In the above, example, for instance, the visual classification data may indicate that the class with the highest confidence score (94%) determined by the visual classifier is associated with the "pasta" section of the store, while the text classification data may indicate that the class with the highest confidence score (87%) determined by the text classifier is also associated with the "pasta" section of the store. Thus, a location-determination component of the mobile cart may use both of these indications to determine that the cart is currently located within the pasta section of the store.

In addition, after using the visual and text classification data to determine an item category or section of the store in which the cart currently resides, the location-determination component may use this determination with additional information to determine a store a current location of the cart. For instance, after determining an item category or section of the store using the classification data (e.g., "pasta section"), the location-determination component may access planogram data representing a planogram of the facility. The location-determination component may analyze the planogram data using the determined item category as a key to determine a location of the cart within the facility, such as an (X, Y) location or the like. That is, given that the planogram data may associated respective item categories (e.g., pasta, dairy, cereal, etc.) with respective location data (e.g., (X, Y) coordinates), the location-determination component may use the determined item category to determine and store location data indicating a current location of the cart.

The location-determination component may determine a location associated with the mobile cart using the visual classification data and the text classification data in any number of ways. For instance, the location-determination component may compute a sum of confidence levels across the classes on which the respective classifiers have been trained and may select the item category (or class) having the highest confidence score. In this example, for instance, the location-determination component may sum up the confidences associated with the pasta, cereal, and dairy sections as follows: 1.81 (0.95+0.87), 0.10 (0.02+0.08), and 0.05 (0.01+0.04). In another example, meanwhile, the location-determination component may determine whether the visual and text classification data each indicate the same class as being associated with a respective highest confidence score and, if so, may select this class as the item category. In still another example, the location-determination component may determine which classification data has a highest confidence score (e.g., 94% "pasta" from the visual classifier in this example) and may select this class as the item category. In some instances, the location-determination component may itself comprise a classifier that has been trained on labeled data and is configured to receive the first and second classification data and output an item category(s) and corresponding confidence level(s). Of course, while a few examples are provided, it is to be appreciated that the location-determination component may fuse this classification data together in any other manner.

In some instances, the visual classifier and the text classifier may operate on bounding boxes (i.e., portions of the image data) within the image data rather than on an entire frame of image data itself. For instance, the visual classifier or another component may use computer-vision techniques to identify bounding boxes that closely encapsulate respective items within the frame of image data. For instance, if an example frame of image data includes ten items on a front-face of a shelf, then the visual classifier may identify coordinates associated with ten bounding boxes. The visual classifier may then operate on each of these bounding boxes independently. Thus, the visual classifier may output, after receiving feature data from the entire frame of image data, respective confidence scores for each of the number of "N" classes for each bounding box. That is, each bounding box may be associated with a set of confidence scores, each associated with a particular class (e.g., pasta, cereal, dairy, etc.).

Similarly, the text classifier may also operate at a bounding-box level. That is, the text classifier, or another component, may identify text data associated with each bounding box. Since each bounding box may closely encapsulate an item, each respective set of words identified for a particular bounding box may comprise text recognizable from that particular item. After the text classifier identifies and/or receives the words associated with each bounding box, the text classifier may output respective confidence scores for each of the number of "N" classes for each bounding box. That is, each bounding box may be associated with a set of confidence scores, each associated with a particular class (e.g., pasta, cereal, dairy, etc.).

In some instances, the location-determination component may determine a final class (or item category) based on these bounding-box scores received from the visual classifier and the text classifier. In one example, the location-determination component may compute a weighted sum of the confidence scores, with the weights being based on a number of bounding boxes being analyzed and a number of words associated with each bounding box. Because weights may be applied based on the number of bounding boxes identified in the visual classifier and the number of words input to the text classifier, it is to be appreciated that the visual classification data may generally be weighted more heavily (based on the higher number of bounding boxes and a fewer number of legible words) in instances where the cart is relatively far from the inventory location, whereas the textual classification data may be weighted more heavily (due to many legible words but relatively fewer identified bounding boxes) when the cart is relatively close to the inventory location. Of course, while this example weights the visual classification data by the number of identified bounding boxes and the textual classification data by the number of identified words, weights may be applied in any other manner. For instance, the cart may be configured to determine a distance from the camera to the inventory location (e.g., via image analysis, an infrared sensor, or the like) and may use this calculated distance to weight the respective classification data. As above, in some instances the visual classification data may be weighted more heavily instances where the cart is relatively further from the inventory location, while the textual classification data may be weighted more heavily when the cart is relatively closer to the inventory location.

Regardless of how the location-determination fuses the visual classification data and the textual classification data, the mobile cart may make a determination regarding the current location of the cart. Further, the cart may update this location determination continuously, periodically, or in response to one or more predefined triggering events. Further, other components of the mobile cart may utilize the location data in any number of ways. For instance, if a user operating the mobile cart has provided the mobile cart with a shopping list, the mobile cart may use the location information to direct a user to a desired item. In another example, the mobile cart may use the information to make an item recommendation to the user, with the recommended item being nearby or being associated with an item that is nearby and/or that was recently placed into the cart. In another example, the mobile cart may determine when the cart is nearing an exit and, in response, may begin preparing to compile an order total for purposes of charging a payment instrument of a user and providing a receipt. Of course, while a few examples have been provided, it is to be appreciated that that the location data can be used in any other manner.

In some instances described herein, the mobile carts that are configured to determine their respective current location may also comprise item-identifying carts that are configured automatically identify items that the users place in their carts as they move around the material handling facilities, as well as to identify the users operating the carts. Upon identifying a user operating a cart and items placed into the cart, the item-identifying cart may update a virtual shopping cart of the user to represent the items that have been placed in, or removed from the physical cart. According to the techniques described herein, an item-identifying cart (or "smart cart") may include one or more first identification cameras positioned on a frame of the cart and directed substantially toward a position typically occupied by a user pushing the cart to generate first image data for identifying the user. For example, the identification image data may represent an identifier associated with an account of the user displayed on a mobile device of the user (e.g., a barcode or the like displayed on a mobile phone), biometric-recognition data representing the user (if the user requests to be identified in this manner), gesture data representing the user, and/or the like. The cart may include components for associating the identification image data with the user, or the cart may send the first image data to one or more remote servers for determining this association.

In addition, the cart may include one or more second identification cameras positioned on the frame of the cart to generate second image data representing items that a user places in the cart, and/or removes from the cart. The cart may include one or more components that analyze the image data to determine an item identifier for the item(s) placed in the cart, or removed from the cart, and update a virtual shopping cart for the user of the cart. Once a user has finished their shopping session, the user may be able to efficiently check-out of the materials handling facility (or "facility") without having to scan or otherwise register their items with a cashier or at a designated self-checkout stand. In some examples, the user may simply depart the facility with their items and entirely avoid a traditional checkout experience of a facility, such as a grocery store. For instance, the user may have registered for a user account with the facility that is automatically charged for purchases of the items listed in a virtual shopping cart of the user that were identified by the cart during the user's shopping session.

In addition, the cart may include one or more proximity sensors for determining when a user is proximate to the cart and when the user is not. In some instances, the cart may be configured to determine when a user is not proximate the cart (e.g., not within a predefined threshold distance of the cart) and, in response, may turn off or otherwise lessen the amount of power consumed by the one or more components of the cart. For instance, the cart may power off or down one or more cameras, a display coupled to the cart, image-processing components configured to analyze image data and identify items and actions represented therein, and/or any other hardware, software, and/or firmware components of the cart. Further, when the cart determines, via the proximity sensors, that the user is again proximate the cart, the cart may power on or up the components previously powered off or down. By selectively powering down or off these components when the user is not within a threshold distance of the cart, the amount of power consumed by the cart is lessened and, thus, a length of time for which the cart may be used prior to recharging a battery of the cart may increase.

In some instances, the cart includes one or more proximity sensors having respective fields-of-view (FOVs) directed towards a basket of the cart, as well as one or more proximity sensors directed towards a handle of the cart used for operating (e.g., moving) the cart. Collectively, the FOVs may enable the proximity sensors to detect when a user is within a threshold distance of the cart, regardless of which side of the cart on which the user is residing. The proximity sensors may comprise optical time-of-flight (ToF) sensors, infrared sensors, ultrasonic sensors, and/or any other type of sensor configured to determine when a user or other object is within a threshold proximity.

Similar to traditional carts, such as shopping carts commonly found at grocery stores or other retail establishments, the item-identifying carts described herein may include a durable frame, including or supporting a basket, made of plastic or metal (often having four sides in a quadrilateral shape), multiple wheel castors configured to allow the cart to move on a surface, and one or more handles for a user to push and/or pull the cart around in a facility. However, the carts described herein may include additional hardware and software components that configure the carts to, among other functions, identify items placed in the carts on behalf of the users, and update virtual carts of the users to automate one or more steps of a traditional shopping experience.

To utilize a smart cart as described above, a user may have registered for a user account with an operator of the facility to utilize various automated management services provided by an operator of the facility. For instance, the user may have registered for a user account to automate payments made for items taken by the user and included a payment means (e.g., credit card, bank account number, etc.), and may have also provided an identification means such that the facility, or carts, can recognize the user. For instance, the user may have registered to identify themselves to the cart using any identification technique, such as presenting an identification means to the first camera/scanner positioned on the frame of the cart (e.g., presenting a driver's license, presenting a facility-issued card, presenting a user identifier via a mobile phone, etc.), speaking a predefined utterance (e.g., a name of the user, a predefined keyword, etc.), and/or looking into the first camera for facial recognition. Once a user has identified themselves to a smart cart, the user may begin a shopping session where the smart cart identifies and tracks items retrieved by the user and placed in the smart cart.

After the user has moved throughout the materials handling facility and selected the items they desire to purchase or otherwise take from the facility, the user may end the shopping session in various ways. For instance, the user may return the cart to a cart corral, provide input to the cart indicating an end of the shopping session (e.g., utterance, utilize a user interface element on a touch display, etc.), or simply remove their bags or other item carriers from the cart and leave the facility. After the user has ended their shopping session, the list of item identifiers in the virtual shopping cart may be uploaded to one or more remote servers that manage user accounts for users of the facility. The servers may charge the appropriate user account for the listing of the items in the virtual shopping cart that the user took from the facility.

Although some of the techniques described below are performed locally on the cart, in other examples, some or all of the techniques may be performed by one or more backend devices or servers associated with the facility. The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that includes a user 104 operating a mobile cart 102 in a facility 112. As illustrated, the mobile cart 102 includes one or more image devices (or "cameras") 106(1) and 106(2) configured to generate image data 114 of an inventory location, such as a rack 108(1) and 108(2) defining an aisle 110, housing one or more items. The mobile cart 106 and/or one or more servers 118 may analyze the image data 114 to determine, based on characteristics of items represented in the image data, a current location of the mobile cart 102 within the facility 112.

As illustrated, for instance, the imaging device 106(1) generates image data 114 of items on the rack 108(2). The mobile cart 102, or the servers 118, may analyze the image data 114 to identify bounding boxes 116, each of which may comprise respective portions within the image data 114 that encapsulate a grouping of one or more instances of a common item. For instance, a first bounding box of the bounding boxes 116 may comprise a portion of the image data 114 corresponding to multiple instances of a first item, a second bounding box of the bounding boxes 116 may comprise a portion of the image data 114 corresponding to multiple instances of a second item, and so forth. The cart, or the servers 118, may then analyze, via a first classifier, visual characteristics associated with each bounding box to determine a possible item category associated with item(s) represented in the respective bounding box, as well as text extracted from items in each bounding box to determine the same or different possible item category associated with item(s) represented in the respective bounding box. The cart may then use both of these information to a determine a most likely item category associated with the items on the rack 108(2) and represented in the image data 114, and this item category may be stored as a current location of the cart 102 or may be used by the cart 102 or servers 118 to determine and store a current location of the cart 102.

As illustrated, the mobile cart 102 may include the one or more imaging devices 106, one or more processors 120, and memory 122. The memory 122 may store a visual classifier 124, a text-extraction component 126, a text classifier 128, and a location-determination component 130. The memory 122 may also store image data 114 generated by the imaging devices 106, first classification data 134 generated by the visual classifier 124, text data 136 generated by the text-extraction component 126, second classification data 138 generated by the text classifier 128, and location data 140 generated by the location-determination component 130. Collectively, the example components stored in the memory 122 may comprise a cart-location component 142.

The visual classifier may analyze the image data 114 to generate bounding boxes 116 representing one or more contiguous instances of a common item and may analyze image data of the bounding boxes 116 to generate the first classification data 134. For instance, the visual classifier 124 may receive a frame(s) of image data 114 generated by the imaging devices 106 and may generate feature data representing the image data. The visual classifier may then analyze the feature data to determine the bounding boxes 116. That is, the visual classifier may determine respective coordinates of the image data 114 representing the bounding boxes. The visual classifier may then analyze the individual bounding boxes 116 to determine a label to associated with each respective bounding box. In some instances, the visual classifier 124 comprises a multi-class classifier that has been trained to output an indication of a confidence value associated with each class of multiple classes. In some instances, the visual classifier may be trained to output which item category of multiple item categories a particular bounding box is most likely to represent based on the feature data within the bounding box. That is, given that the feature data is based on the visually salient features of the image data associated with the bounding box, the visual classifier 124 may be configured to output an indication of which item category the items in the bounding box most "look like."

Figure 3:
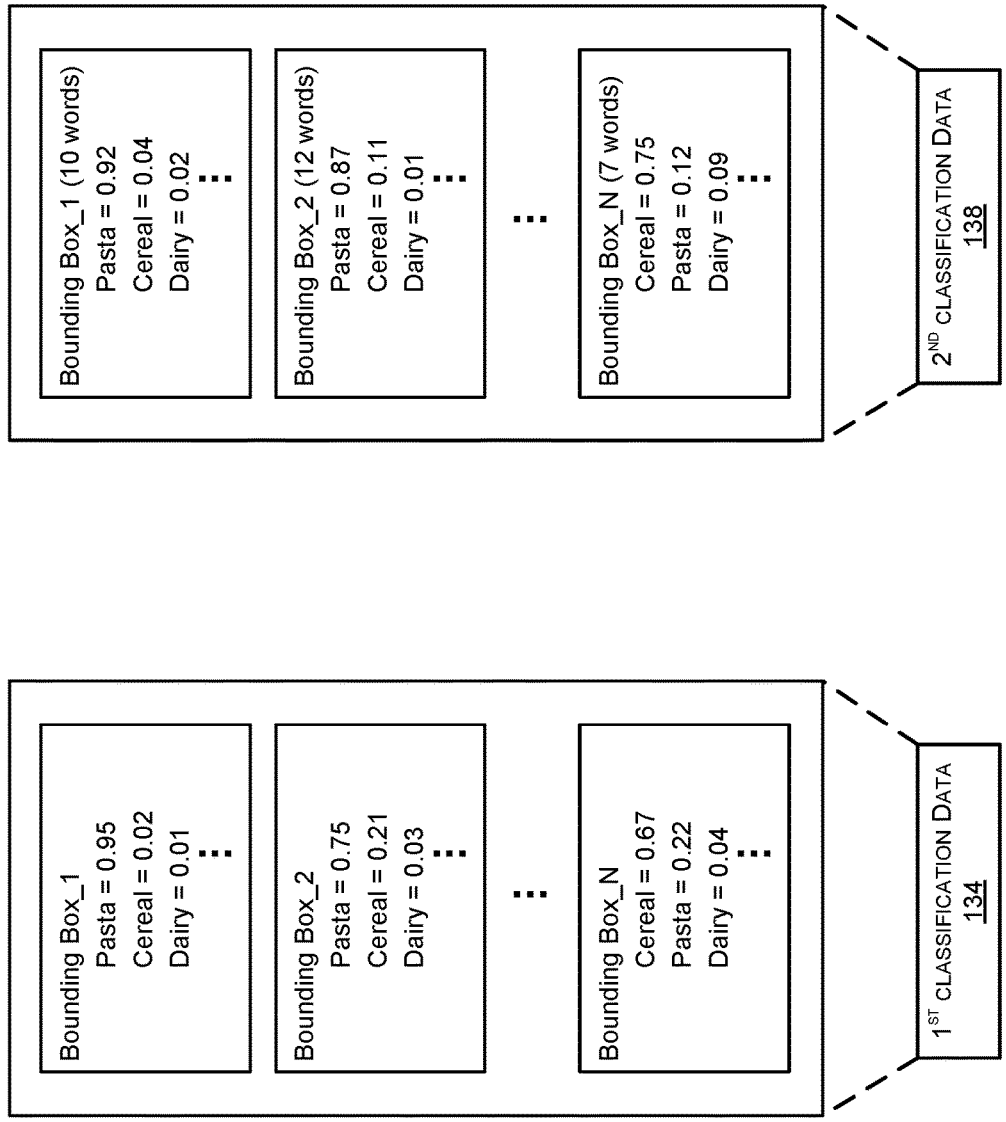
FIG. 3 illustrates example first classification data and example second classification data.

In the example of a grocery store, the visual classifier 124 may be configured to determine a confidence level indicating a likelihood that each respective bounding box represents an item category such as pasta, cereal, dairy, produce, snacks, beverage, deli, or the like. In a hardware store example, meanwhile, the visual classifier 124 may be configured to determine a confidence level indicating a likelihood that each respective bounding box represents an item category such as a power tool, a fastener, lighting, plumbing, garden, and so forth. Of course, while a few examples have been given, it is to be appreciated that the cart or other device may be operable in other retail and non-retail environments. Further, it is to be appreciated that while the visual classifier may make this determination on a per-bounding-box basis, in other instances the visual classifier 124 may operate on an image frame as a whole and, thus, may output a single indication indicating the item category(s) and corresponding confidence level(s). In either instance, the visual classifier 124 may generate, as output, the first classification data 134 indicating the label(s)/class(es) and corresponding confidence level(s). FIG. 3, described below, illustrates example first classification data 134.

In addition to using the visual classifier 124 to determine what items on the rack 108(2) "look like", the mobile cart 102 may use the text classifier 128 to analyze visible text on the items to determine a likely item type of the items, and thus a likely location of the cart 102. To do so, a text-extraction component 126 may analyze the image data 114 to extract or identity text data 136 represented therein. In some instances, the text-extraction component 126 may receive an indication of the bounding boxes (e.g., respective coordinates within the image-data frame(s)) and may extract or identity text on a per-bounding box basis. In other instances, the text-extraction component 126 may extract or identify text on a per-frame basis.

In either instance, the text-extraction component 126 may input the extracted text data 136 into the text classifier 128, which may analyze the text and output the second classification data 138. As with the visual classifier 124, the text classifier 128 may be trained on labeled data and configured to output an indication, on a per-bounding-box or per-frame basis, an indication of a most likely label represented by the bounding box or frame. For instance, the text classifier 128 may receive the text data 136 and may output an indication of a respective confidence level associated with each of multiple classes based on the text data 136. In some instances, the text classifier 128 analyzes each of the words identified in a particular bounding box as a group so that, collectively, the words give context to one another and, taken together, are more likely to represent the meaning of the words than if analyzed individually.

Like the visual classifier 124, in the example of a grocery store the text classifier 128 may be configured to determine a confidence level indicating a likelihood that each respective bounding box represents an item category such as pasta, cereal, dairy, produce, snacks, beverage, deli, or the like. In a hardware store example, meanwhile, the text classifier 128 may be configured to determine a confidence level indicating a likelihood that each respective bounding box represents an item category such as a power tool, a fastener, lighting, plumbing, garden, and so forth. Of course, while a few examples have been given, it is to be appreciated that the cart or other device may be operable in other retail and non-retail environments. Further, it is to be appreciated that while the text classifier 128 may make this determination on a per-bounding-box basis, in other instances the text classifier 128 may operate on an image frame as a whole and, thus, may output a single indication indicating the item category(s) and corresponding confidence level(s). In either instance, the text classifier 128 may generate, as output, the second classification data 138 indicating the label(s)/class(es) and corresponding confidence level(s). FIG. 3, described below, illustrates example second classification data 138.

After the visual classifier 124 has generated the first classification data 134 and the text classifier 128 has generated the second classification data 138, the location-determination component 130 may use both data to generate location data 140 representing an item category and/or a current location of the cart 102 in the facility 112. In some instances, the location-determination component 130 sums the confidence values associated with each respective class as represented in the first classification data 134 and the second classification data 138 and selects the class having the highest sum as the item category and/or location. For instance, envision the first classification data 134 that a first label is associated with a score or confidence level of 0.90 and a second label is associated with a score of 0.10, while the second classification data 138 indicates that the first label is associated with a score or confidence level of 0.85, while the second label is associated with a score or confidence level of 0.15. The location-determination component 130 may sum these values together such that the first label is associated with a score of 1.75 and the second label is associated with a score of 0.25. The location-determination component may then select the first label to store as the location data 140. As discussed above, this location data may comprise an item category, which may represent a particular section within the facility, such as a pasta section, a dairy section, or the like. In another example, the location-determination component 130 may itself comprise a trained classifier configured to use machine-learning techniques to receive the first and second classification data and output the location data 140.

In some instances, the location-determination component 130 applies a first weight to the first classification data 134 and a second weight to the second classification data 138 when determining the final item category or the final location. In some instances, these weights may be based on a distance between the cart 102 and the rack 108 or other inventory location, where the first weight applied to the first classification data is greater when the distance is greater and lesser when the distance is lesser, and the second weight is greater when the distance is lesser and lesser when the distance is greater. That is, given that text will be more identifiable when closer to the inventory location, the weight applied to the second classification data determined by the text classifier may be greater when the cart is closer to the shelf or rack. Further, given that there will likely be a larger number of bounding boxes within the field-of-view of the image device 106 when the cart is further from the shelf or rack, the weight applied to the first classification data may be larger.

In some instances, the cart 102 may determine the distance from the cart 102 (e.g., the imaging device 106) to the inventory location, such as using a time-of-flight sensor, an infrared sensor or the like. The location-determination component 130, meanwhile, may then use this distance calculation to determine the weights to apply to the first and second classification data. In other instances, meanwhile, the location-determination component 130 may use the number of bounding boxes detected by the visual classifier 124 and/or the number of words identified by the text-extraction component 126 within each respective bounding boxes as a proxy for this distance. For instance, the location-determination component 130 may select a first weight to apply to the first classification data 134 based on the number of "N" bounding boxes that the visual classifier 124 has detected, and may select a weight for the second classification data 138 based on the number of words detected within each bounding box. In some instances, the first weight applied to the first classification data 134 may increase with an increasing number of bounding boxes, while the second weight applied to the second classification data 138 may increase with an increasing number of extracted words.

Further, while the above exampled describes the location-determination component 130 generating the location data 140 using the first and second classification data, in some instances the location-determination component 130 may use additional data to make this determination. For instance, the location-determination component 130 may use information such as a previously determined location of the cart 102, information regarding historical or typical layouts of retail facilities, or the like. To provide an example, if the location-determination component 130 determined that the last location of the cart 102 was in the "pasta" section of the facility 112, then the location-determination component 130 may bias a subsequent location calculation towards that location and/or to other locations associated with that item category, such as "pasta sauce".

In other examples, after using the first classification data and the second classification data to determine an item category in which the cart 102 currently resides, the location-determination component 130 may use this determination with additional information to determine a store a current location of the cart and store this data as the location data 140. For instance, after determining an item category or section of the store using the classification data (e.g., "pasta section"), the location-determination component 130 may access planogram data representing a planogram of the facility. The location-determination component 130 may analyze the planogram data using the determined item category as a key to determine a location of the cart 102 within the facility, such as an (X, Y) location or the like. That is, given that the planogram data may associated respective item categories (e.g., pasta, dairy, cereal, etc.) with respective location data (e.g., (X, Y) coordinates), the location-determination component 130 may use the determined item category to determine and store location data 140 indicating a current location of the cart 102.

Figure 2A:
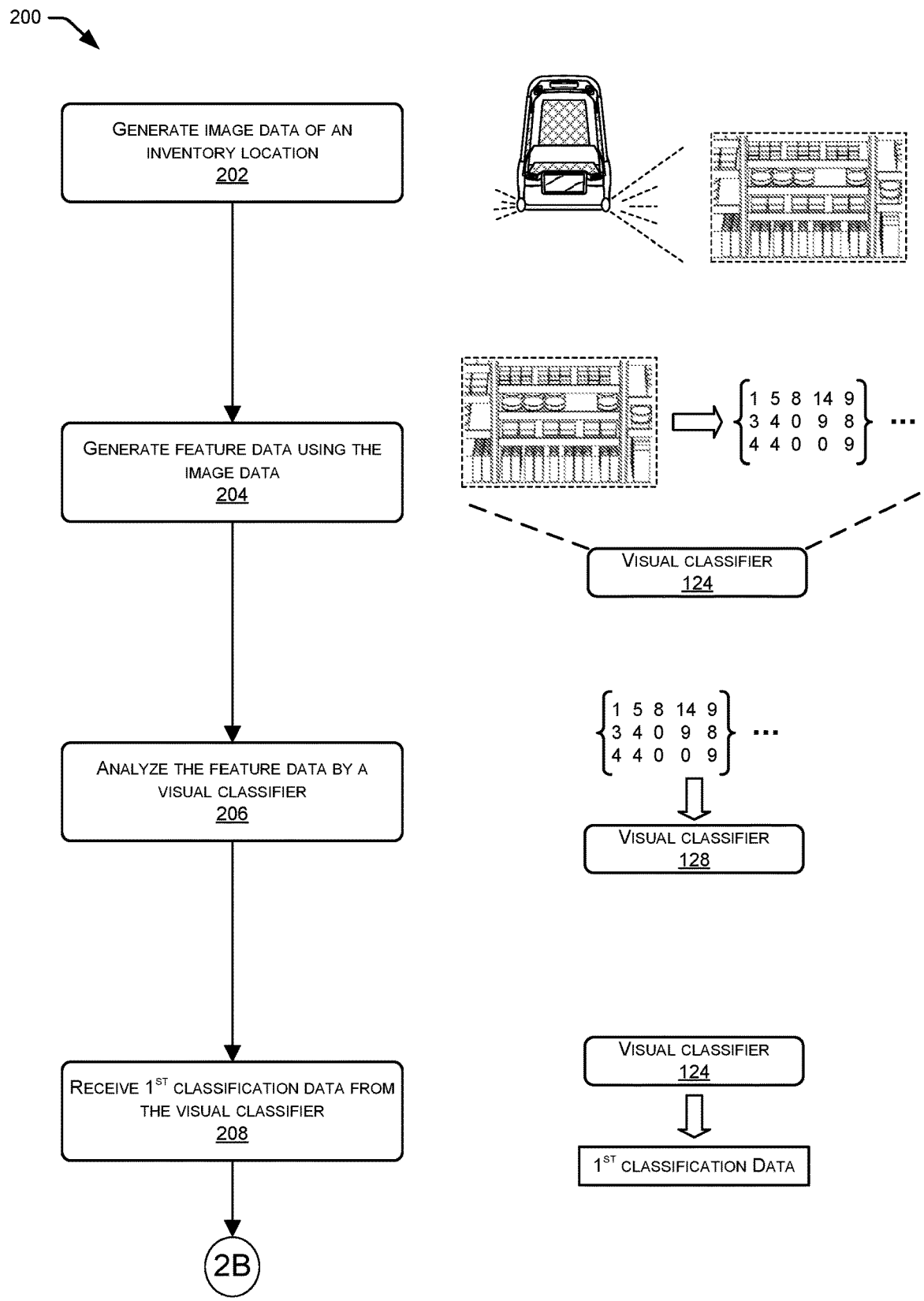
FIGS. 2A-B collectively illustrate an example sequence of operations in which the mobile cart of FIG. 1 is able to determine its current location with the facility based on analysis of image data generated by one or more cameras of the cart. In this example, the mobile cart may use a first classifier to generate feature data associated with the image data and analyze the feature data to generate first classification data, and may input text data associated with the image data into a second classifier for generating second classification data. The cart may use the first and second classification data to determine a location of the mobile cart and/or an item category associated items represented in the image data.
Figure 2B:
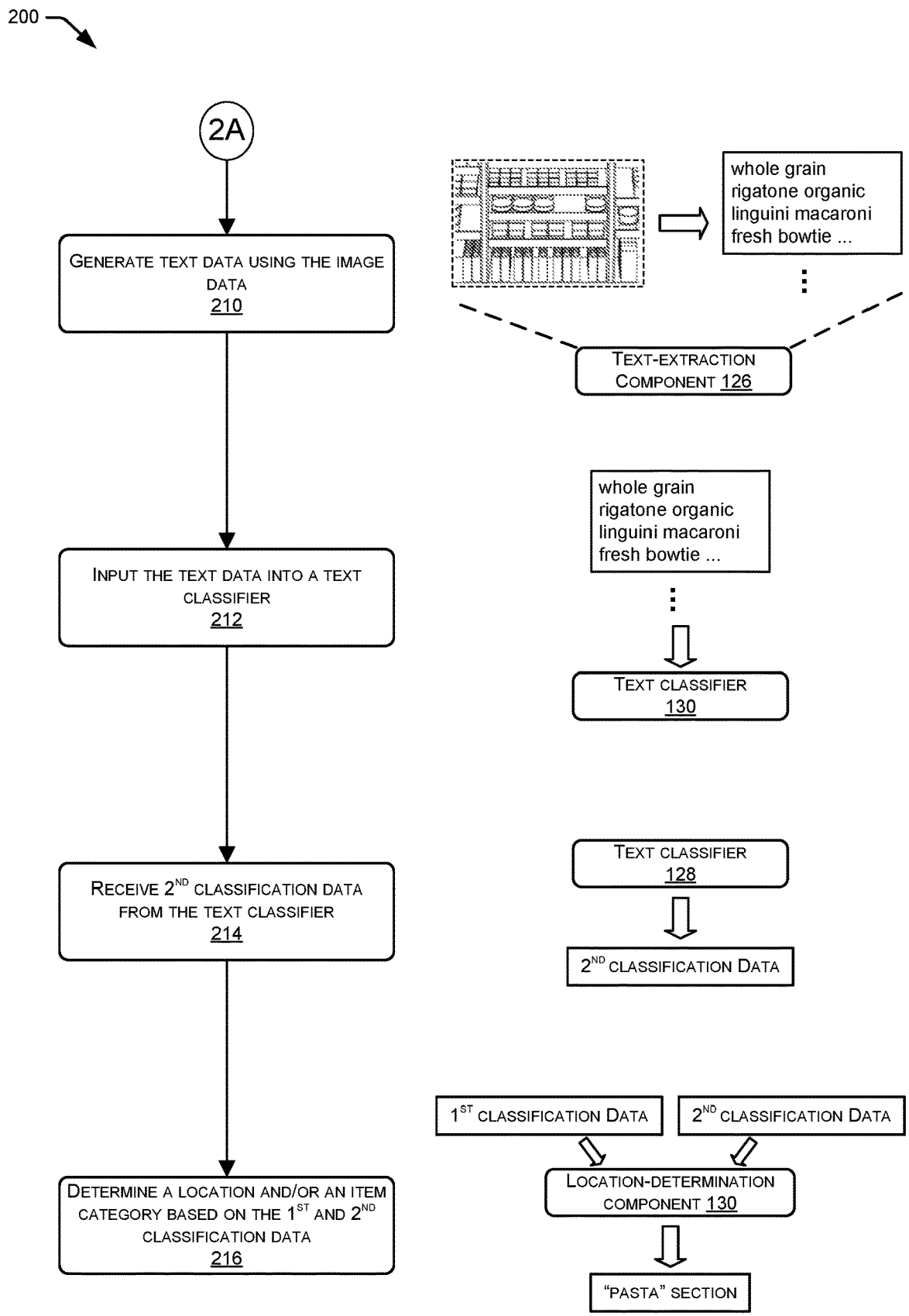

FIGS. 2A-B collectively illustrate an example sequence of operations 200 in which the mobile cart 102 is able to determine its current location with the facility 112 based on analysis of image data generated by one or more imaging devices 106 of the cart 102. This process, as well as the additional processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, the processes described herein may be performed, in whole or in part, by the servers 118, the cart 102, and/or a combination thereof.

An operation 202 represents generating image data of an inventory location, which may house one or more items. As described above, an imaging device onboard a mobile cart or other apparatus may periodically or continually generate image data of the inventory location such that a current location of the cart may be periodically or continually determined.

An operation 204 represents generating feature data representative of the image data using the image data generated at the operation 202. As discussed above, this generating may be done by a visual classifier. Thus, the operation 204 may comprise inputting the image data into the trained visual classifier such that the visual classifier generates the feature data representative of the image data.

An operation 206 represents analyzing the feature data by the visual classifier. That is, the visual classifier may analyze the generated feature data for determining a label or class to assign to the image data associated with the feature data. An operation 208 represents receiving first classification data as output of the visual classifier. As described above, the first classification data may comprise respective confidence levels associated with respective classes. In other words, the first classification data may indicate a likelihood that, according to the visual classifier, the image data represents each of multiple classes upon which the visual classifier has been trained. It is to be appreciated that while operations 204 and 206 are illustrated serially, the visual classifier 124 may output the indication of the bounding boxes and the confidence levels at a same time.

FIG. 2B continues the illustration of the sequence of operations 200 and includes, at an operation 210, generating text data using the image data. In some instances, this operation includes analyzing the bounding boxes determined by the visual classifier to identity text printed on items or other surfaces within each respective bounding box. An operation 212 represents inputting the text data into a text classifier. As described above, the text data associated with each bounding box may be input as a group rather than individually such that the text classifier is able to analyze the words in context rather than alone. This may influence the second classification data, given that certain words (e.g., "whole", "organic", etc.) may appear across multiple different sections of a retail store and are understood better when viewed with adjacent words (e.g., "whole grain", "organic pasta sauce", etc.). Further, while the text classifier 128 may analyze text on a bounding-box basis, in other instances it may analyze the text associated with a frame of image data as a whole.

An operation 214 represents receiving, as output of the text classifier, second classification data. As described above, the second classification data may comprise respective confidence levels associated with respective classes. In other words, the second classification data may indicate a likelihood that, according to the text classifier, the inputted text data represents each of multiple classes upon which the text classifier has been trained.

Finally, an operation 216 represents determining a location of the mobile cart and/or an item category based at least in part on the first and second classification data. For instance, the first and second classification data may be input to the location-determination component 130, which may output a final item category. This item category may be stored as the location of the cart or may be used to determine a location. For instance, the location of the cart may be stored as "pasta section", or the determined item category (e.g., "pasta section") may be mapped to location coordinates or other location information, such may be stored as the current location of the cart.

FIG. 3 illustrates example first classification data 134 and example second classification data 138. As indicated above, the visual classifier 124 may generate the first classification data 134 while the text classifier 128 may generate the second classification data 138. As illustrated, the first classification data 134 may indicate a number of portions of the image data, or "bounding boxes", that the visual classifier 124 has identified. The visual classifier 124 may analyze the inputted image data 114 to identify the bounding boxes, each of which may correspond to a portion of the image data that illustrates a group of contiguous instances of a common item.

After identifying the bounding boxes, the visual classifier 124 may analyze respective feature data associated with each bounding box to determine a confidence level associated with each respective class upon which the visual classifier has been trained. In the illustrated example, for instance, the visual classifier 124 has determined that the first bounding box most likely represents items associated with a class entitled "pasta", given that it has output a confidence level of 0.95 for this class. In addition, the visual classifier 124 has associated a confidence level of 0.02 with the class of "cereal" and a confidence level of 0.01 for the class of "dairy". Further, the visual classifier 124 has made similar determinations for the other bounding boxes two through "N". Collectively, these confidence levels may comprise the first classification data 134.

The second classification data 138, meanwhile, is generated by the text classier 128, as described above. In this example, the text classifier 128 analyzes the text that has been identified within each respective bounding box (e.g., as determined by the visual classifier 124) and outputs, on a per-bounding-box basis, a confidence level associated with each respective class upon which the text classifier 128 has been trained. In the first bounding box, for instance, the text classifier 128 has assigned a confidence level of 0.92 to the class of "pasta", a 0.04 confidence level to the class of "cereal", and a 0.02 confidence level to the class of "dairy". Further, the second classification data 138 indicates that the first bounding box is associated with ten extracted words, and this number of words may be used to select a weight to the confidence levels determined by the text classifier 128 for this bounding box. The second bounding box and the Nth bounding box, meanwhile, are associated with twelve and seven extracted words, respectively, and these number of words may be used to apply a weight to these confidence levels when the location-determination component 130 combines the first and second classification data.

Figure 4:
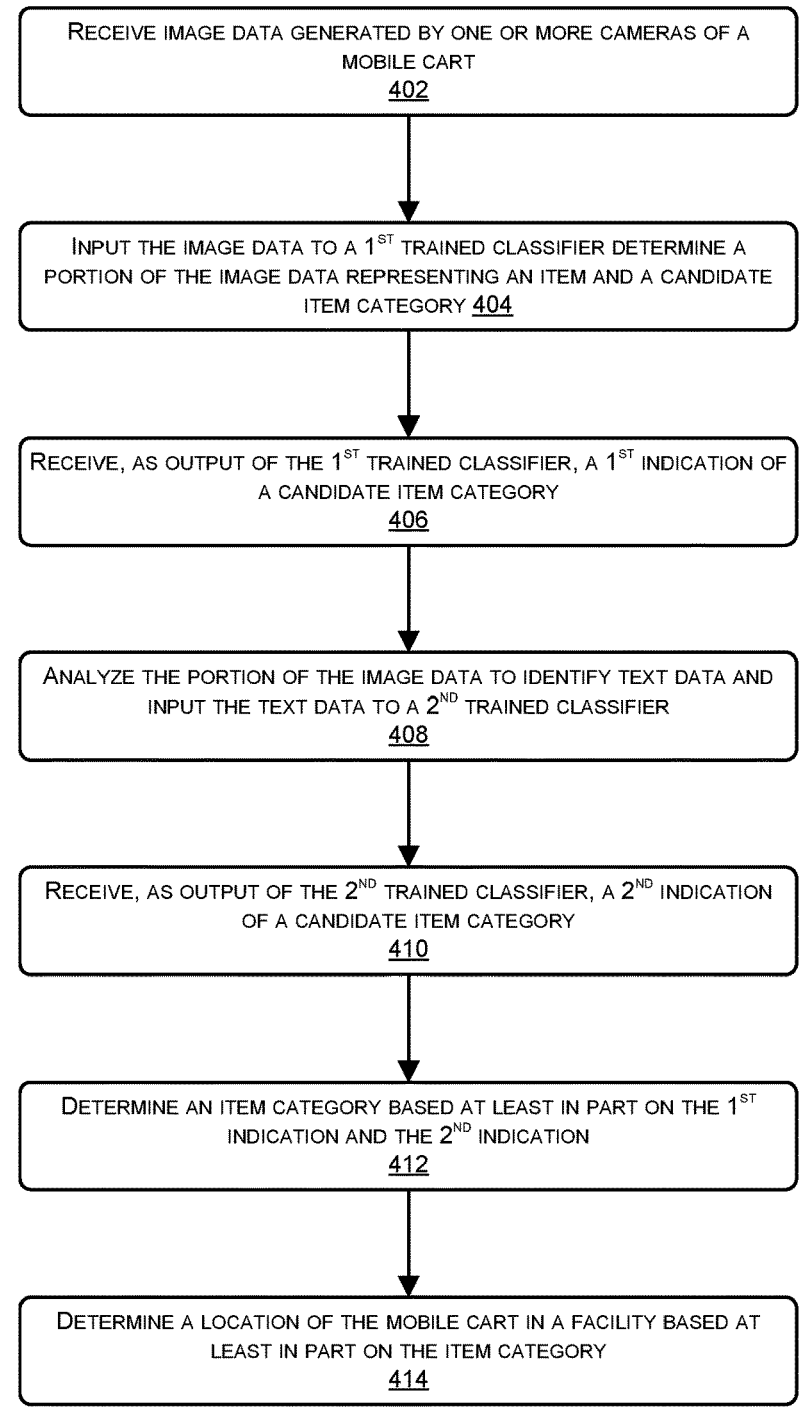
FIG. 4 illustrates a flow diagram of an example process that a mobile cart or one or more other computing devices may perform to determine a location of the mobile cart within a facility.

FIG. 4 illustrates a flow diagram of an example process 400 that a mobile cart or one or more other computing devices may perform to determine a location of the mobile cart within a facility. An operation 402 represents receiving image data generated by one or more cameras coupled to a frame of a mobile cart. In some instances, the frame may define a basket and the camera(s) may be directed substantially away from the basket to generate image data of an inventory location in a facility.

An operation 404 represents inputting the image data into a first trained classifier that is configured to generate feature data from the image data and determine, using the feature data, a portion of the image data representing an item residing at the inventory location and a candidate item category associated with the item. In some instances, the first trained classifier may comprise the visual classifier described above.

An operation 406 represents receiving, as output of the first trained classifier, a first indication of a candidate item category associated with the item. In some instances, this comprises receiving the first classification data, described above, which may represent a candidate item category associated with a highest confidence level.

An operation 408 represents analyzing the portion of the image data to identify text data and inputting the text data into a second trained classifier. For instance, the text-extraction component described above may extract the text data on a per-bounding-box basis and provide this text data and indications of respective bounding boxes into the text classifier described above.

An operation 410 represents receiving, as output of the second trained classifier, a second indication of a candidate item category associated with the item. In some instances, this comprises receiving the second classification data, described above, which may represent a candidate item category associated with a highest confidence level based on the text data.

An operation 412 represents determining an item category based at least in part on the first indication and the second indication. For instance, the location-determination component described above may determine an item category by summing the respective confidence values, inputting the first and second classification into a trained classifier and receiving, as output, an indication of the item category, or the like. Finally, an operation 414 represents determining a location of the mobile cart in the facility based at least in part on the item category. This may comprise storing the item category as the location, mapping the item category to a location, or the like.

Figure 5:
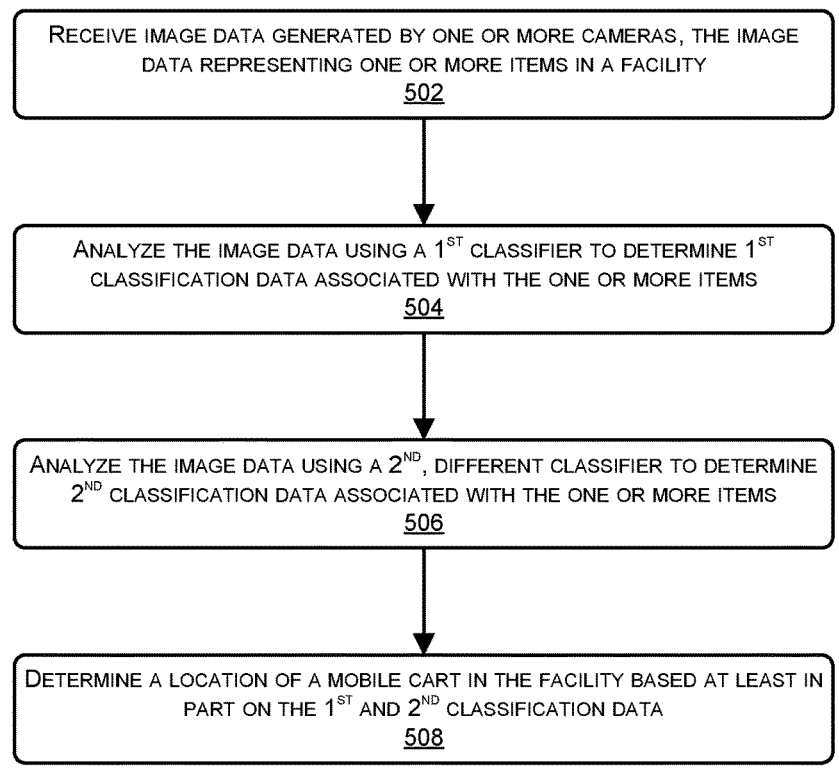
FIG. 5 illustrates a flow diagram of another example process that a mobile cart or one or more other computing devices may perform to determine a location of the mobile cart within a facility.

FIG. 5 illustrates a flow diagram of another example process 500 that a mobile cart or one or more other computing devices may perform to determine a location of the mobile cart within a facility. An operation 502 represents receiving image data generated by one or more cameras of a mobile cart, the image data representing one or more items in a facility.

An operation 504 represents analyzing the image data using a first classifier to determine first classification data associated with the one or more items. In some instances, the first classifier comprises a classifier that is trained to generate feature data associated with respective portions of the image data and output an item category associated with each respective portion of the image data based at least in part on the feature data.

An operation 506 represents analyzing the image data using a second classifier that is different than the first classifier to determine second classification data associated with the one or more items. In some instances, the second classifier comprises a classifier that is trained to receive text data represented in respective portions of the image data and output an item category associated with each respective portion of the image data based at least in part on the text data. Further, in some instances the analyzing the image data using the first classifier comprises receiving, as output of the first classifier, a first indication of an item category associated with a first item represented in a portion of the image data and the first classification data includes at least the first indication of the item category. In addition, analyzing the image data using the second classifier comprises receiving, as output of the second classifier, a second indication of an item category associated with text printed on a second item represented in the image data, and the second classification data includes at least the second indication of the item category.

An operation 508 represents determining a location of the mobile cart in the facility based at least in part on the first classification data and the second classification data. In some instances, determining the location comprises determining a section of multiple sections of the facility in which the mobile cart currently resides. In addition, and as described above, analyzing the image data using the first classifier may comprise receiving, as output of the first classifier: (i) an indication of a number of portions within the image data that correspond to a respective item; and (ii) an item classification associated with each respective item, the first classification data being based at least in part on the item classification associated with each respective item. In addition, or in the alternative, analyzing the image data using the second classifier may comprise analyzing the image data using the second classifier to determine: (i) a number of words within a first portion of the image data that corresponds to a first item of the one or more items; and (ii) a first item classification associated with the first item, the second classification data being based at least in part on the first item classification. In some instances, determining the location of the mobile cart in the facility may be based at least in part on the first classification data, the second classification data, the number of portions within the image data that correspond to a respective item, and/or the number of words.

Figure 6:
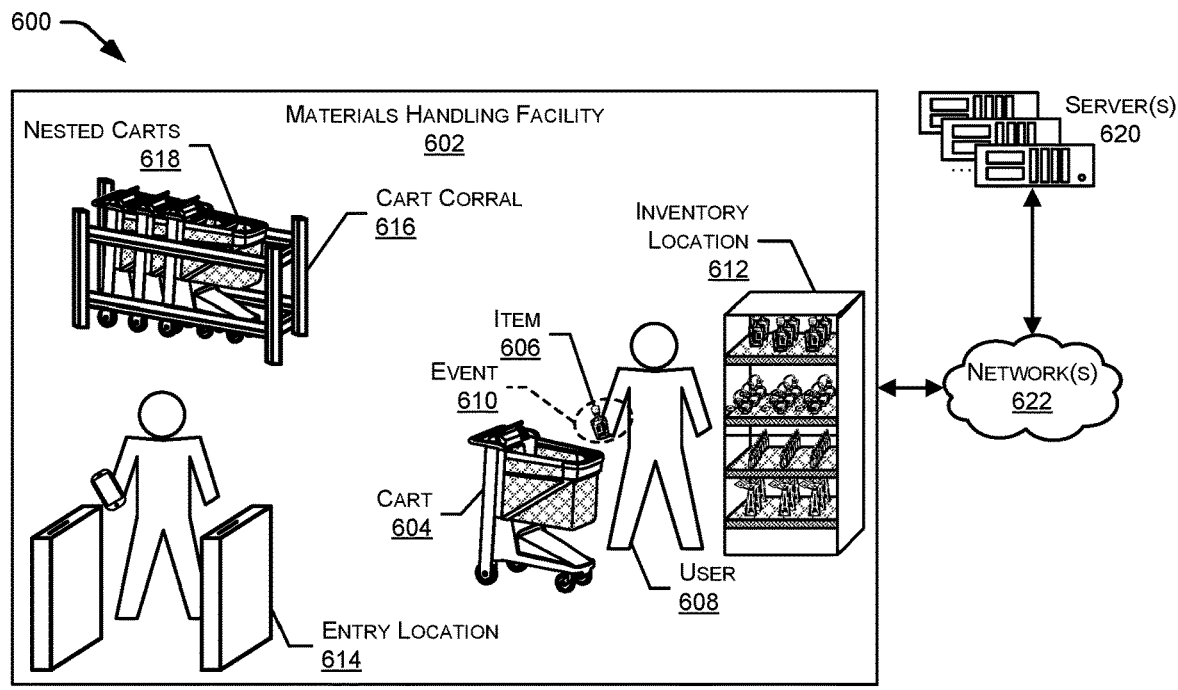
FIG. 6 illustrates an example environment of a materials handling facility that includes an item-identifying cart to identify items placed in, and removed from, a basket of the cart by a user. The cart may also be configured to determine its location using the techniques described with reference to FIGS. 1-5.
Figure 6:
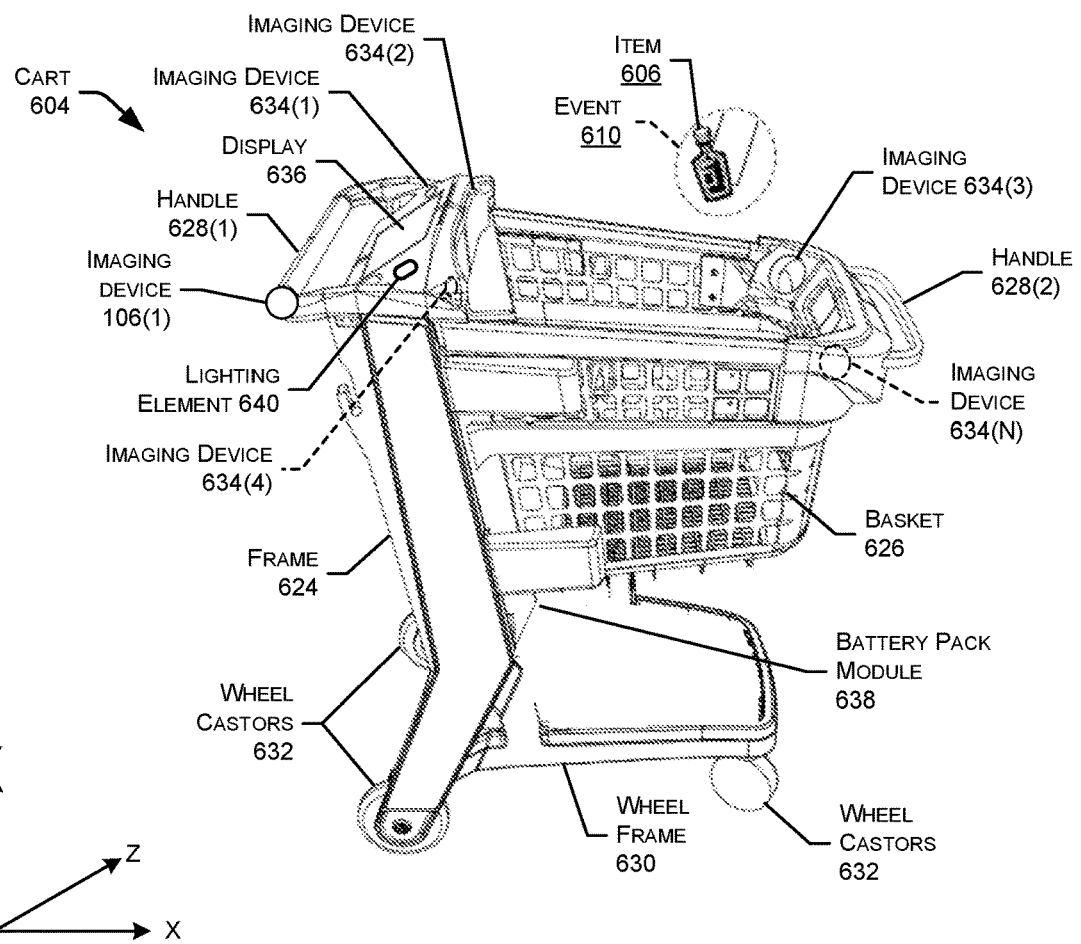

FIG. 6 illustrates an example environment 600 of a materials handling facility 602 that includes an item-identifying cart 604 to identify items 606 placed in, and removed from, a basket of the cart 604 by an example user 608. In some instances, the cart 604 corresponds to the cart 102 described above. In addition to identifying and analyzing image data for determining a location of the cart, the cart 604 may generate first image data for identifying a user and generate second image data depicting the item 606. In addition, the cart may analyze the second image data to identify an item identifier for the item 606, determine the event 610 involving the item (e.g., add to cart, remove from cart, multiple items, quantity of items, etc.) and update a virtual shopping cart associated with the identified user 608 using the item identifier.

As FIG. 6 depicts, the user 608 may have engaged in a shopping session in the materials handling facility 602. For instance, the user 608 may have selected an item 606 from an inventory location 612 (e.g., shelf, aisle, etc.) and placed the item 606 in the cart 604 (e.g., shopping cart). The inventory location 612 may house one or more different types of items 606 and the user 608 may pick (i.e., take, retrieve, etc.) one of these items 606.

As illustrated, the materials handling facility 602 (or "facility") may have one or more entry locations 614, such as lanes. The entry location 614 may be defined by a gate in some examples and may include a movable barrier to control movement of users 608. For example, the gate may include computer-controlled panels that may be closed to impede passage of the users 608 or opened to permit passage of the user 608. Upon entering a facility 602, a user 608 may desire to utilize a cart 604 for their shopping session to transport items 606 around the facility 602 during their shopping session. In such examples, the user 608 may approach a cart corral 616, or other locations, at which carts 604 are stored. In some examples, the cart corral 616 may comprise a structure, such as an aisle, for storing nested carts 618.

Generally, two or more of the carts 604 may be configured to nest or otherwise functionality join with one another, so that the carts 604 may be easily stored in a cart corral 616, and/or transported in bulk. In some examples, the cart corral 616 may provide additional functionality beyond storage. For instance, the cart corral 616 may facilitate charging of the nested carts 618 that are in the cart corral 616. For instance, the cart corral 616 may have various electrical contacts extending along the length of a horizontal and/or vertical member of the corral 616 that, when placed in electrical contact with an electrical contact of the nested carts 618, charge one or more batteries of the nested carts 618. In other examples, power cords may extend from the cart corral 616 that may be plugged into the nested carts 618 to recharge batteries of the nested carts 618 while not in use.

In some instances, as described above, each of the nested carts 618 may reside in a low-power (e.g., deep-sleep) state when in the cart corral 616. For instance, proximity sensors of the cart may detect an object (e.g., another cart) very near and, in response, may cause the respective cart to enter the low-power state. In addition, or in the alternative, each cart may include a mechanical switch that may be actuated when placed into the cart corral 616, resulting in the cart entering the low-power state. In still other instances, when the cart corral 616 includes the electrical contacts to contact with corresponding contacts of the nested carts 618, each cart may use this signal to cause the cart to enter the low-power state. Of course, while a few examples are provided, the carts may enter the low-power state in any number of ways when nested with other carts in the corral 616.

To utilize a cart 604, a user 608 may approach an unused cart that is not currently engaged in a shopping session (e.g., a nested cart 618), and interact with the unused cart 604 to identify themselves to the cart 604 and begin a shopping session. For instance, the carts 604 may include a first imaging device 634(1) (e.g., an image sensor such as a camera, photodetector, or other sensing apparatus designed to read a one or two-dimensional barcode) such that when a user 608 presents a user device, or portion thereof, such as the display, to the imaging device 634(1), the cart 604 may identify the user and corresponding user account for a shopping session. Other types of interaction may be performed by a user 608 to identify themselves to a cart 604 (e.g., uttering a name or other keyword to identify the user 608, presenting the user's face for facial recognition, typing in a password or other user information into a display of the cart 604, and/or any other type of user identification technique).

Further, in some instances the cart 604 may transition from a low-power state to a higher-power state in response to the user approaching the cart 604 and/or removing the cart 604 from the corral 616. For instance, the imaging devices 634 and/or the proximity sensors may identify the user approaching (e.g., entering within the threshold distance of the cart 604) and, in response, may cause the cart to enter the higher-power state by, for example, powering on and/or up one or more components that were previously powered off and/or down. In another example, removing the cart 604 from the corral 616 may cause the mechanical switch to trip or may cause the electrical contacts of the corral 616 to become uncoupled from the contacts of the cart 604, resulting in the cart entering the higher-power state. Again, while a few examples are provided, it is to be appreciated that the cart may transition from a low-power state to a higher-power state in response to being removed from the corral 616 and/or in response to a user approaching the cart 604 in any number of other ways.

Once a user has identified themselves to the cart 604, the item-identifying functionality of the cart 604 may be activated such that subsequent items 606 placed in the cart 604 will be identified by the cart 604 and added to a virtual shopping cart for the user 608. As illustrated, a user 608 may move the cart 604 around the facility 602 to one or more inventory locations 612. The user 608 may retrieve items from the inventory location 612 and place the items 606 in the cart 604. Additionally, the user 608 may retrieve items 606 from the cart 604 and put the items 606 back in an inventory location 612, such as when the user 608 changes their mind regarding their desire to purchase or otherwise acquire the item 606. The cart 604 may include various components for identifying item identifiers corresponding to the items 606 placed in the cart and maintaining a virtual shopping cart for the shopping session of the user 608.

Once the user 608 has finished their shopping session, the user 608 may end the shopping session in various ways. For instance, the user 608 may return the cart 604 to the cart corral 616, provide input to the cart 604 indicating an end of the shopping session (e.g., utterance, utilize a user interface element on a touch display, etc.), or simply remove item bags or other item carriers from the cart 604 and leave the facility 602. After the user 608 has ended their shopping session, the list of item identifiers in the virtual shopping cart may be uploaded to one or more remote servers 620, over one or more networks 622, that manage user accounts for users 608 of the facility 602. The server(s) 620 may charge the appropriate user account for the listing of the items in the virtual shopping cart that the user took from the facility 602. For instance, the server(s) 620 may be configured to determine or generate information indicative of a cost of the items 606 picked by the user 608. Additionally, the server(s) 620 may store payment information (e.g., credit card information, bank account information, etc.) for each user account. In this way, when the user 608 finished their shopping session and the cart 604 sends the listing of item identifiers in the virtual shopping cart over the network(s) 622 to the server(s) 620, the server(s) 620 may be configured to determine a cost or price for all of the listed item identifiers, and charge the user via their payment information for the items 606 selected during their shopping session. In this way, the user 608 need not go through steps of a traditional check-out experience (e.g., waiting in line for a cashier, scanning items with the cashier, paying for items at the cashier, etc.).

The network(s) 622 may include private networks such as an institutional or personal intranet, public networks such as the Internet, or a combination thereof. The network(s) 622 may utilize wired technologies (e.g., wires, fiber optic cable, and so forth), wireless technologies (e.g., radio frequency, infrared, acoustic, optical, and so forth), or other connection technologies. The network(s) 622 is representative of any type of communication network, including one or more of data networks or voice networks. The network(s) 622 may be implemented using wired infrastructure (e.g., copper cable, fiber optic cable, and so forth), a wireless infrastructure (e.g., cellular, microwave, satellite, etc.), or other connection technologies.

The cart 604 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 622 according to the type of protocol or standard being used. As noted above, in some examples, the servers 620 may perform some or all of the operations described below as being performed by the cart 604. While the servers 620 are illustrated as being in a location outside of the facility 602, in other implementations, at least a portion of the servers 620 may be located at the facility 602.

As illustrated, the cart 604 may generally include or be formed of a frame 624, a basket 626, a first handle 628(1) for pushing the cart 604, a second handle 628(2) for pulling the cart, a wheel frame 630, and one or more wheel castors 632 to enable movement of the cart 604 on a surface. The frame 624, the basket 626, the handles 628, and the wheel frame 630) may be formed from any suitable materials such as plastics, wood, metals, composites or any other combinations of materials. Moreover, frame 624, the basket 626, the handle 628, and the wheel frame 630 may take any form.

The basket 626 may generally be part of the frame 624 and/or supported by the frame 624 (e.g., be welded, fused, adhered, bolted, screwed, molded, or otherwise joined to the frame 624). In some examples, the basket 626 may comprise a grid or lattice-like structure (e.g., a honeycombed arrangement or framework) having one or more bars or members that are welded, fused, adhered, bolted, screwed, molded, stitched or otherwise joined in a substantially perpendicular alignment with respect to one another. The basket 626 may generally be any shape that defines an interior cavity, or receptacle, for receiving items 606 that are placed in the cart 604. The basket 626 may comprise a bottom, multiple sides protruding from the bottom, and a top. As illustrated, the bottom basket 626 may be in the shape of a quadrilateral such that there are four sides protruding from the bottom of the basket 626. Similarly, the top of the basket 626 may be defined according to the quadrilateral shape and have a perimeter with four corners. The perimeter of the top of the basket 626 may define an opening to the interior cavity (or receptacle) of the basket 626 to receive items placed inside the basket 626. In various examples, the perimeter of the top of the basket may be disposed in a substantially horizontal plane (e.g., a plane substantially along the x-axis as illustrated), and the frame 624 may include at least one vertical member that extends downward from the basket 626 to the wheel frame 630 along a substantially vertical plane (e.g., a plane substantially along the y-axis as illustrated).

The wheel frame 630 may support one or more wheel castors 632 to enable movement of the cart 604 along a surface. The wheel casters 632 include one or more wheels, axles, forks, joints or other components which enable the cart 604 to travel on various surfaces. For example, in some implementations each of the wheel casters 632 may include a single wheel provided on an axle within a fork, or two or more wheels provided on such an axle. In some other implementations, the wheel casters 632 may include two or more axles. Alternatively, in still other implementations, a single caster may be provided in lieu of the multiple wheel casters 632 shown in FIG. 6. In accordance with the present disclosure, the wheel casters 632 may operate in any manner, such as being configured to pivot or swivel, and thus automatically adjust or align with a direction of travel. In some examples, the cart 604 may be equipped with other apparatuses for enabling the cart 604 to travel on solid surfaces, including one or more wheeled components other than casters, including but not limited to omnidirectional wheels, spherical wheels or other like apparatuses. Additionally, in some other implementations, the cart 604 may include two or more skis or other runners for traveling on smooth surfaces. In still other implementations, the cart 604 may be levitated, e.g., by magnetic levitation through the use of one or more linear induction motors. Moreover, the cart 604 may be propelled or pushed by humans or autonomous mobile robots or, alternatively, by one or more motors (e.g., electric-powered or gasoline-powered).

As illustrated, the cart 604 may include a first imaging device 634(1), for identifying a user operating the cart as described above, and additional, second imaging devices 634(2), 634(3), 634(4) . . . , 634(N) that include components for use in identifying items placed in the basket 626 and removed from the basket 626. The imaging device 634(1) may, in some instances, be positioned in a manner such that an FOV of the imaging device 634(1) is away from the basket 626 and substantially towards the first handle 628(1)

where a user may typically operate the cart 604. The imaging devices 634(2)-(N) may be positioned at any location on the cart 604 (e.g., in the basket 626, on the basket 626, mounted to the frame 624, mounted to the basket 626, and/or any other location), oriented to have respective FOVs for identifying events that occur within and proximate to the basket 626. In some examples, the cart 604 may include at least four of the second imaging devices 634(1), 634(2), 634(3), and 634(N) that are disposed or coupled proximate to four corners of the top of the basket 626. In some examples, one or all of the components of the second imaging devices may be disposed internal to the form factor of the basket 626 and/or frame 624, at least partially internal to the form factor of the basket 626 and/or frame 624, and/or entirely external to the form factor of the basket 626 and/or frame 624 (e.g., mounted to the cart 604). However, in the illustrated example, the second imaging devices may be disposed at locations proximate to the four corners of the top or perimeter of the basket 626/frame 624. In some instances, the less that the second imaging devices protrude from the form factor of the cart 604, the more efficiently the carts 604 may be nested with respect to each other.

As described in further detail below with respect to FIG. 7, the cart 604 may further include one or more one light sources (e.g., LED) for emitting light at or prior to the time of the second imaging devices generating the second image data. The cart 604 may further include, in some instances, one or more proximity sensors (e.g., ToF sensor, PIR sensor, etc.). In some examples the proximity sensors may be activated to detect the proximity of users, objects above the top of the basket 626, and/or other objects. The proximity sensors may be configured to generate sensor data that indicates distances between objects above the top of the basket 626 of the cart 604 and the second imaging devices. The cart 604 may include components configured to analyze the sensor data and determine that an item 606 is within some threshold distance from the top of the basket 626 and/or within the basket 626. Upon detecting an object within the threshold proximity of the basket 626 using the proximity sensor, one or more components of the cart 604 may cause the light sources (LEDs) to emit light and the second imaging devices to generate image data. In some examples, the FOVs of the second imaging devices 634(2)-(N) may each at least partially overlap at a location above the top of the basket 626 corresponding to a centroid of the quadrilateral defining the top of the basket 626. The light sources may illuminate the basket 626 and/or the area above the top of the basket 626 to illuminate items 606 being placed in the cart 604, or removed from the cart 604, to act as a "flash" for the cameras that are generating image data. The second imaging devices may generate image data for a predefined period of time and/or until the proximity sensors (or the image data itself) indicates that there is no longer an object within the threshold distance from the cart 604 or top of the cart 604.

After generating the image data, one or more components of the cart 604 may process the image data to determine an item identifier for the item(s) 606 represented in the image data, and an event 610 for the image data (e.g., addition of an item 606 to the cart, removal of an item 606 from the cart). As described in more detail below with respect to FIG. 13, the cart 604 may include component(s) to determine an item 606 identifier for the item 606 (e.g., name of the item 606, SKU number for the item 606, etc.), and determine if the item 606 is being taken from the cart 604, or added to the cart 604, based on the motion of the item 606 and the result of the movement around the cart 604 once movement is no longer detected and represented by the image data. The components of the cart 604 may then update a virtual shopping cart associated with the cart 604 that indicates a virtual listing of items 606 taken by the user 608 from the facility based on the determined event 610. In some examples, the image data may be transmitted to the server(s) 620 over the network(s) 622 where the processing may be performed.

In various examples, the cart 604 may include a display 636 to present various information in user interface(s) for the user 608 to consume. In some examples, the display 636 may comprise a touch screen to receive input from the user 608 (e.g., a selection of an item identifier to disambiguate amongst potential item identifiers). In some instances, the display 636 may present customized information to the user 608 upon identifying the user 608, such as a shopping list of the user or the like.

The cart 604 may further include a battery pack module 638 that houses one or more batteries to power the components of the cart 604. The battery pack module 638 may include rechargeable batteries. In some examples, the battery pack module 638 may be detachably coupled to the wheel frame 630 and/or the frame 624 of the cart 604 such that the battery pack module 638 may be removed and taken to a charging station. In various examples, the battery pack module 638 may include rechargeable batteries that may be charged when the cart 604 is placed in a cart corral 616 (e.g., through electrical contacts, power cords, etc.). In various examples, the frame 624 and/or basket 626 may have one or more channels (e.g., grooves, holes, paths, tunnels, etc.) through which power cables/cords may pass. In this way, power cables may be run at least partially through the channels in the frame 624 and/or basket 626 inconspicuously to provide power to the various components of the cart 604.

In some instances, the cart 604 may further include one or more lighting elements 640 disposed on the frame 624 and/or basket 626 of the cart 604. The user 608 may, in some instances, operate a controller to turn on (and off) the lighting element(s) 640 to cause the lighting element(s) to emit light. Further, in some instances the controller may enable the lighting element(s) 640 to transition between multiple light states, such as different colors, flashing effects, and/or the like. The controller operable by the user 608 may comprise functionality accessible to the user 608 via the display (e.g., one or more soft buttons for turning on and/or off the light), a physical toggle switch on the frame 624 of the cart 604, and/or the light. Further, the lighting element(s) 640 may be used to signal a predefined state of the cart 604 and/or the user 608. For example, the user 608 may turn on the lighting element(s) 640 to indicate that he or she requests assistance from an associate of the facility 602, or for any other reason. In some instances, in response to the user 608 operating a controller to request assistance, the cart 604 may perform one or more actions in addition to turning on the lighting element(s) 640. For example, the display may present content responding to this request, such as an offer to connect the user 608 with an associate of the store (e.g., in person, via I/O devices of the cart, etc.). For example, in response to requesting assistance, the cart 604 may facilitate an audio-only or an audio/video call between the user 608 and an associate of the facility using one or more I/O devices on the cart, such as the display, one or more speakers, one or more microphones, one or more cameras pointed toward the user 608 and/or the like.

In still other instances, associates of the facility may, remotely or otherwise, operate the lighting element(s) 640 to change states (e.g., turn on or off) and/or the cart 604 may include components to automatically change a state of the lighting element(s) 640. For example, upon the card identifying that an item of a predefined class of items has entered the basket, the cart 604 may cause the lighting element(s) 640 to change state (e.g., from an off state to an on state) to indicate that an additional checkout workflow may now be required. For example, if the user 608 places an item into the basket 626 that requires the purchasing user to be of a certain age (e.g., alcohol) or to have a certain prescription (e.g., medicine), the cart 604 may illuminate the lighting element(s). In some instances, the cart 604 may include a lighting element on a right side of the frame, a lighting element on a left side of the frame, and/or one or more other lighting elements in other locations on the cart 704.

Figure 7:
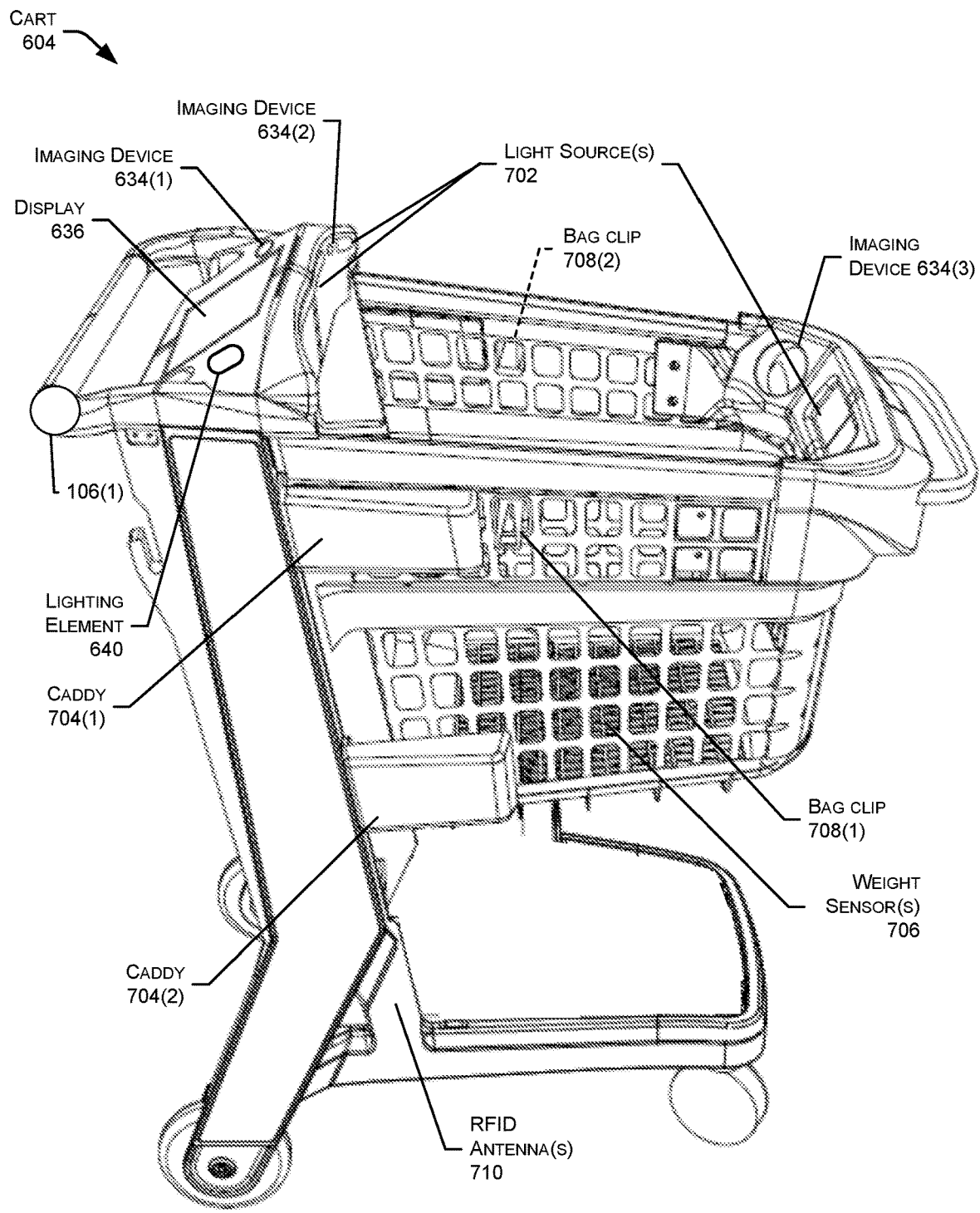
FIG. 7 illustrates the example cart of FIG. 6 in further detail. As illustrated, the cart may include at least one camera for identifying a user and one or more cameras for identifying items placed into and removed from the cart. The cart may include additional components, such as one or more weight sensors on each side of the basket of the cart, a handlebar on each side of the cart for pushing and/or pulling the cart, and various other features.

FIG. 7 illustrates the cart 604 of FIG. 6 in further detail. As illustrated, the cart may include the first imaging device 634(1) for identifying a user, the one or more second imaging devices 634(2)-(N) for identifying items placed into or removed from the basket 626, the display 636 for presenting information to a user operating the cart 604, and the one or more lighting elements 640. In addition, the cart 604 may include one or more light sources 702 that function to emit light prior to and/or while the second imaging sensors 634(2)-(N) generate the second image data for identifying items placed into and removed from the basket 626. In some instances, these light sources 702 emit constant light, while in other instances the light sources 702 emit light in a strobing manner. In either of these instances, the light may be visible and/or non-visible light.

In addition, the cart may include one or more caddies, such as a caddy 704(1) and a caddy 704(2), coupled to the left and/or right side of the frame or basket of the cart 604. For example, the cart 604 may include the first and second caddies 704(1) and 704(2) on the right side of the cart, and two similarly situated caddies on the left side of the cart (not shown). Each caddy may define a receptacle (e.g., having an opening at the top) for housing one or more items therein. In some instances, the caddies may be beyond the FOV of the second imaging devices 634(2)-(N) such that the user is able to place personal items (e.g., keys, wallet, phone, etc.) into the receptacle defined by the respective caddy without the imaging devices 634(2)-(N) generating image data corresponding to this addition. In other instances, the caddies may be within the FOV of one or more of the imaging devices.

In addition, the cart 604 may include one or more respective weight sensors 706 for determining a current weight of the basket 626 and, thus, items in the basket 626. For example, one or more weight sensors 706 comprising strain gauges or the like may reside underneath the basket 626. In some instance the bottom platform of the cart may also include one or more weight sensors for determining the weight of items on the bottom platform. Further, in some in some instances each caddy may comprise a respective weight sensor 706 comprising a strain gauge or other sensor that continuously or periodically may be used to determine a weight of the basket and/or whether a change in weight has occurred. For instance, the cart 604 may include two weight sensors 706 on each side of the basket 626. Each pair of weight sensors 706 may, in some instances, reside along the same vertical axis. That is, a top weight sensor on the right side of the basket 626 may reside above a bottom weight sensor on the right side.

Regardless of the location of the weight sensors 706, the weight data may be used to identify when items have been placed into or removed from the basket and, in some instances, may be used to identify items placed into or removed from the basket. For example, the weight data may be used to determine the identity of an item placed into or removed from the basket (e.g., to identify that a bottle of ketchup was placed into the basket), identify a number of instances of an item (e.g., a number of bottles of ketchup placed into the basket), to measure an amount of something (e.g. 1 pound of peanuts), and/or the like.

FIG. 7 further illustrates that the cart 604 may include one or more bag clips, such as a bag clip 708(1) on a right side of the basket 626 and a bag clip 708(2) on a left side of the basket 626. As illustrated, the bag clips 708 may reside on an outside, top portion of the basket such that a user may place a bag into the interior of the basket while securing a first strap of the bag to the first clip 708(1) and a second strap of the bag to the second clip 708(2). Thereafter, the user may place items into and/or remove items from the bag. At the end of the shopping session, the user may remove the bag containing the items from the basket (e.g., by removing the straps from the clips) and exit the facility.

FIG. 7 further illustrates that the cart 604 may include one or more RFID antenna(s) 710, which may be used for determining a location of the cart 604 within the facility 602. In some instances, the inventory locations 612 may include respective RFID tags that may be read by the RFID antennas 710 of the cart. In some instances, the cart 604, or a remote system communicatively coupled to the cart 604, may store map data that indicates associations between respective location with the facility to respective RFID tags throughout the facility. As illustrated, in some instances the RFID antennas 710 may reside near a bottom portion of the frame of the cart. For instance, the cart 604 may include an RFID antenna near a bottom portion of the right side of the frame and an RFID antenna near a bottom of the left side of the frame. In other instances, however, the RFID antennas 710 may reside at other locations on the cart 604 and/or distributed at multiple locations on the cart 604.

Figure 8:
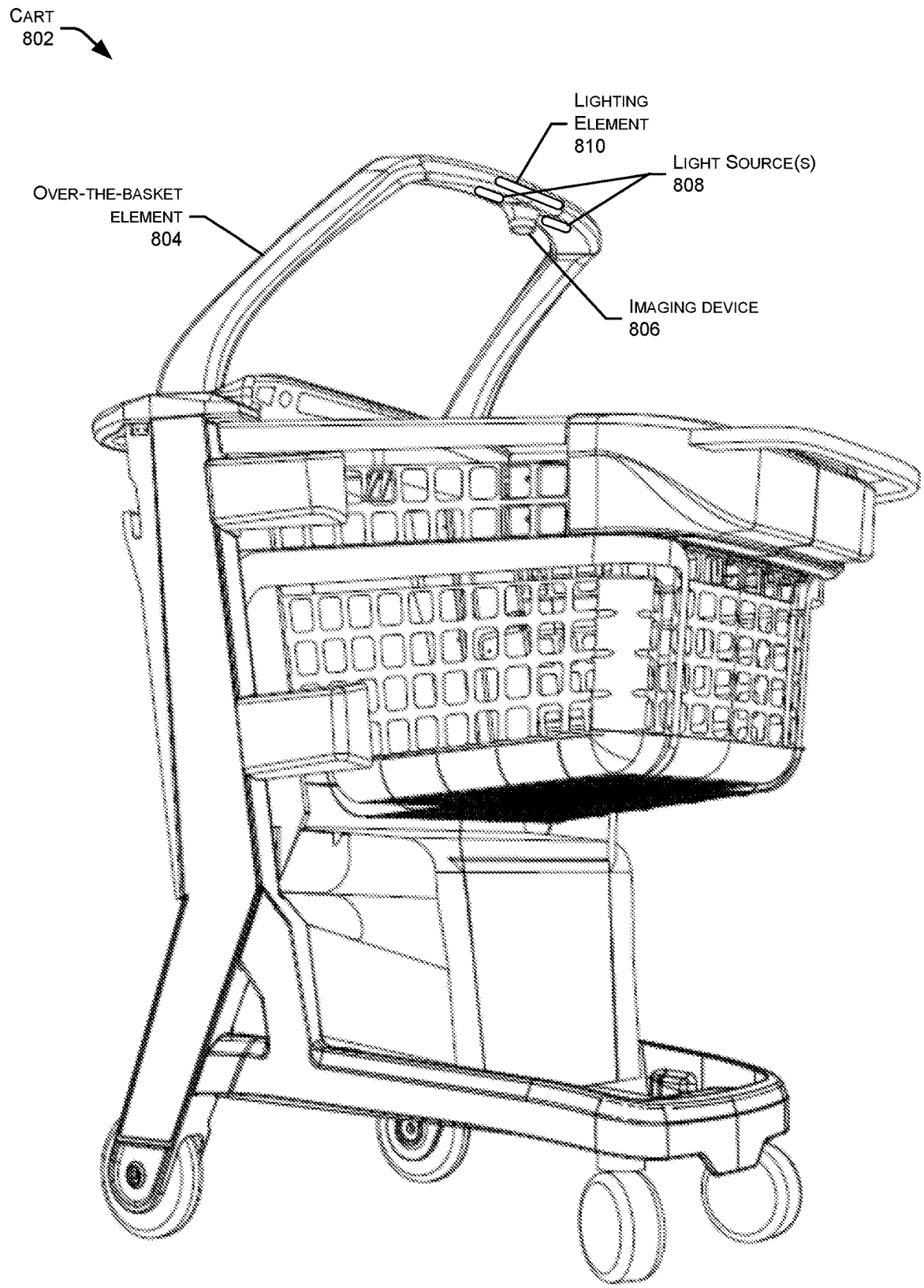
FIG. 8 illustrates an example cart that includes an over-the-basket element that may include a camera having a field-of-view into the basket of the cart for identifying items. The over-the-basket element may also couple to a lighting element configured to toggle between one or more states, such as an off state and an on state in which a user is requesting assistance.

FIG. 8 illustrates another example cart 802 that may include some or all of the features described herein, including the proximity sensors and corresponding functionality described above and below. In addition, the illustrated cart 802 includes an over-the-basket element 804 that may include an imaging device 806 having a field-of-view into the basket of the cart for identifying items. That is, the imaging device 806 may couple to a bottom surface of the element 804 and may have an FOV that is directed substantially downwards into the basket. The over-the-basket element 804 may also include one or more light sources 808 configured to emit light, similar to the light sources 702 discussed above and below. These light sources may emit a constant light or may emit light according to a strobing pattern. Further, in some instances the light sources 808 and/or 702 may emit light in response to a proximity sensor detecting the presence of an item near the basket 626. In some instances, the over-the-basket structural element 804 may be detachable from the frame and/or basket of the cart, such that merchants (or users) may selectively remove the element 804 as desired.

As illustrated, the over-the-basket element 804 may further include one or more lighting elements 810 configured to toggle between one or more states, such as an off state and an on state. Similar to the lighting element 640 discussed above, a user operating the cart 802, an associate in the facility, and/or the cart 802 itself may be configured to change a state of the lighting element 810 (e.g., from an off state to an on state, from a first color, to a second color, etc.). In some instances, the lighting element 810 may emit light in response to a user operating a controller (e.g., physical switch, the display 636, etc.) to indicate that the user is requesting assistance. In another example, the lighting element 810 may indicate that the user and/or contents of the cart are subject to a particular workflow based on contents of the cart and/or the like (e.g., an age-verification workflow in which an associate of the facility is to verify an age of the use operating the cart 802 and requesting to acquire a particular item).

Figure 9:
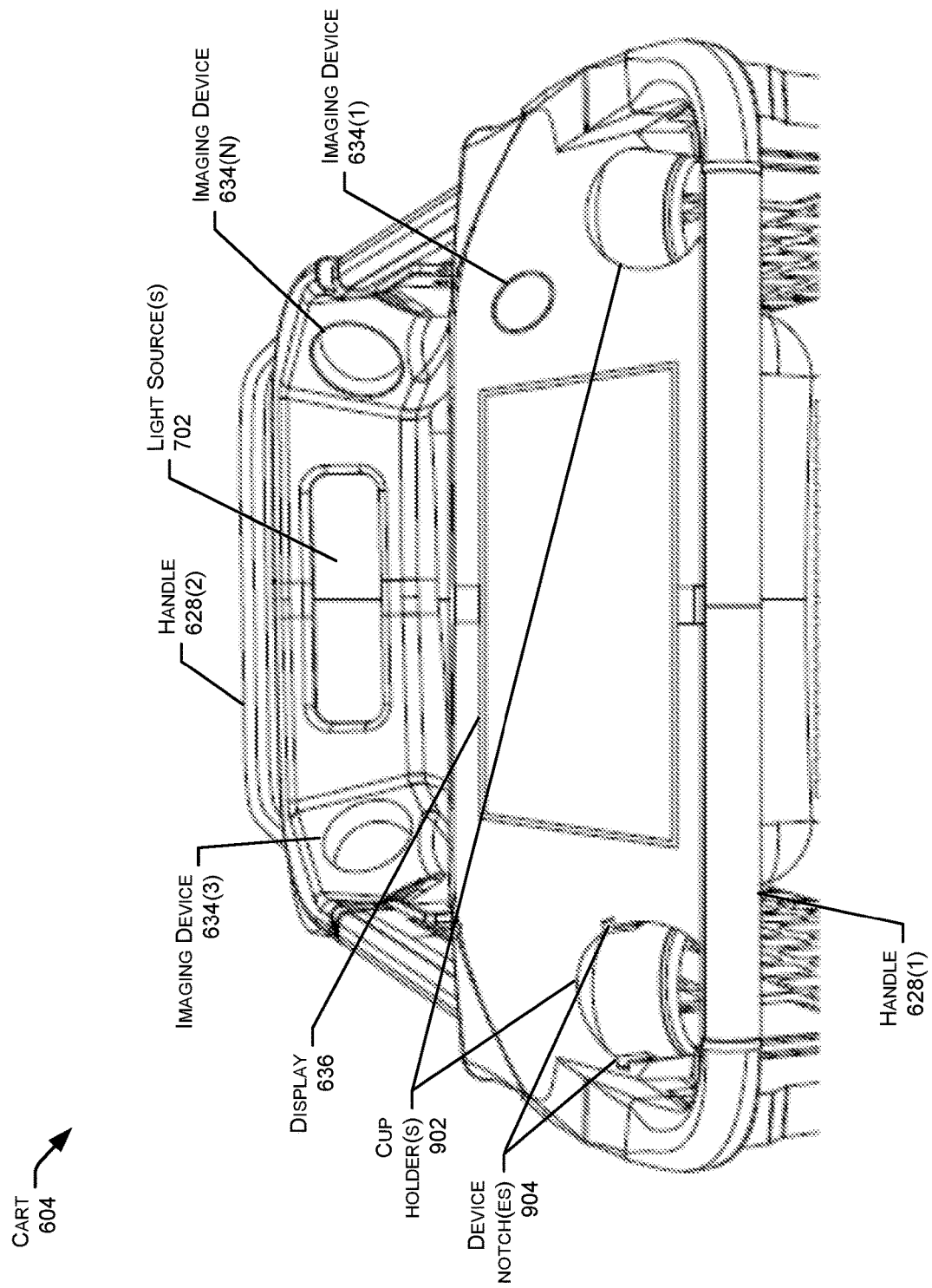
FIG. 9 illustrates an example front view of a cart. As illustrated, the cart includes a handlebar for pushing the cart, a camera for generating data for identifying a user operating the cart, and a display to present content to the user.

FIG. 9 illustrates an example front view of the cart 604. As illustrated, the cart includes the first handle 628(1) for pushing the cart 604, the second handle 628(2) for pulling the cart 604, the imaging device 634(1) for generating data for identifying a user operating the cart, the second imaging devices 634(2)-(N), and the display 636 to present content to the user operating the cart. The front view also illustrates that the cart may include the light source(s) 702 between the imaging device 634(3) and 634(N). In some instances, the cart may further include a light source to the left of the imaging device 634(3) and/or a light source to the right of the imaging device 634(N).

In addition, the cart 604 may include one or more cup holder 902 (in this example, on the left and right sides of the display 636) for holding respective cups of the user. In addition, each cup holder may include one or more device notches 904, comprising recesses of the cup holder in which a user may secure a device, such as a mobile phone or the like. That is, the device notches 904 may provide respective slots in which a user may place an electronic device, such as a phone, in a manner in which the device is secure while a display of the device is oriented towards the user operating the cart. Thus, the user, may engage in the shopping session while having a shopping list or the like displayed on a device that sits securely in the device notches 904 of the cup holder 902.

Figure 10:
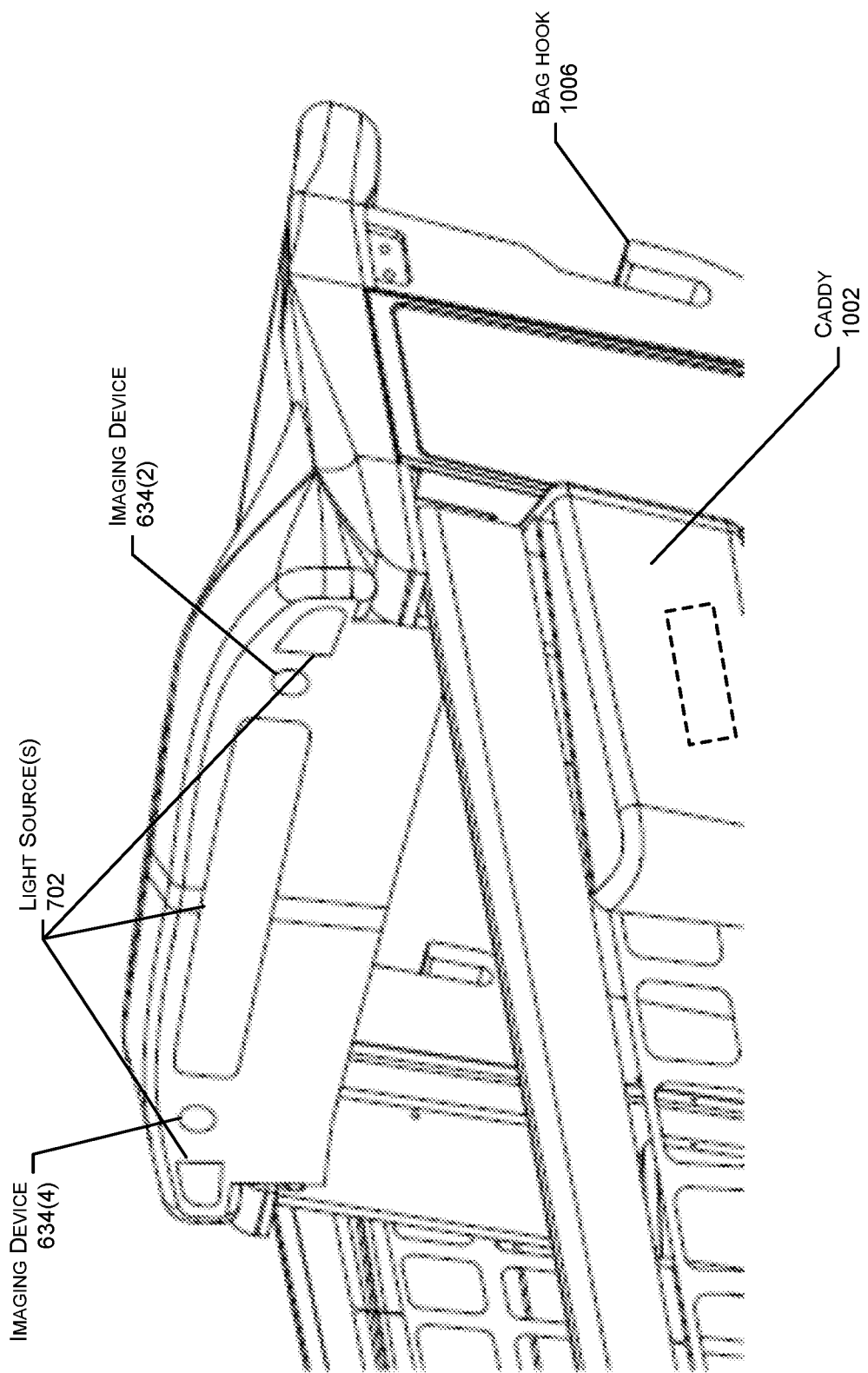
FIG. 10 illustrates a closer view of one or more cameras having a field-of-view substantially towards the basket of the cart.

FIG. 10 illustrates a closer view of one or more imaging devices 634(2) and 634(4) having an FOV substantially towards the basket of the cart. This figure also illustrates that the cart 604 may include one or more light sources 702 between the imaging devices 634(2) and 634(4), to the left of the imaging device 634(4), and/or to the right of the imaging device 734(2). In addition, FIG. 10 illustrates an example caddy 1002, which may define a receptacle for housing one or more items, as discussed above. Finally, this figure illustrates that the frame 624 of the cart 604 may include one or more bag hooks 1006, comprising hooks in which a user operating the cart 604 may secure one or more bags. In some instances, the cart 604 may include a bag hook 1006 on a rear-left side of the frame (e.g., near a user operating the cart) and/or a bag hook 1006 on a rear-right side of the frame. Further, while not illustrated, it is to be appreciated that the cart 604 may include proximity sensors.

Figures 11A, 11B:
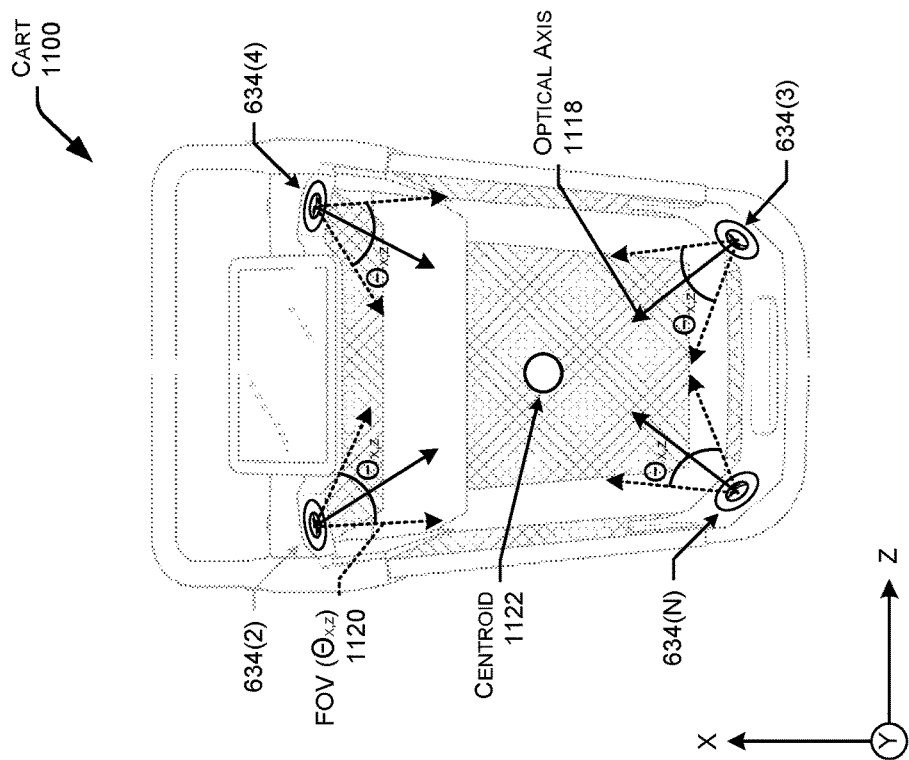
FIGS. 11A-D illustrate example views of an item-identifying cart that has one or more cameras for identifying items placed in the cart.

FIG. 11A illustrates an example cross-sectional view of an item-identifying cart 1100 that includes imaging device 634 for identifying items 606 placed in the cart 1100. Again, the cart 1100 may include the proximity sensors and corresponding functionality as described above with reference to the cart 1100. While this cart 1100 may have a different form factors than other carts illustrated and described herein, characteristics of the cart 1100 may be applied to the other cart form factors, and vice versa. As illustrated, the cross-section of the cart 1100 is taken along a plane defined by the x-axis and y-axis along the center of the cart 1100 from the back to the front of the cart 1100.

In some examples, the imaging device 634(2) is positioned at a first corner of the basket 626 near the back of the cart 1100. The imaging device 634(2) may have an optical axis 1104 and an FOV 1106 oriented along the x-y plane. The optical axis 1104 of the first capture assembly 634(1) may be directed upward from a substantially horizontal plane 1108 and towards the interior of the perimeter of the basket 626. In some examples, the basket 626 may include a bottom of the basket 1112, ones or more sides of the basket 1114 protruding up from the bottom 1112, and a top of the basket (perimeter) 1110 that is disposed along the substantially horizontal plane 1108. In some examples, the FOV 1106 of each of the second imaging devices may have a lower edge that is defined according to the horizontal plane 1108.

The first imaging device 634(2) may have an optical axis 1104 directed upward from the substantially horizontal plane 1108 and towards the interior of the perimeter 1110 of the basket 626. In some examples, the FOV ($\theta_{x,y}$) 1106 may be defined according to the optical axis 1104 (e.g., the optical axis 1104 may be approximately the middle of the FOV 1106). The FOV 1106 may be any FOV for of the second imaging devices (e.g., 80 degrees. 70 degrees, 45 degrees, etc.). Generally, the FOV 1106 may at least partially include an area above the top of the basket 1110. Similarly, another imaging device 634(4) coupled proximate to a corner of the basket 626 on the front of the cart 1100. The imaging device 634(4) may have an optical axis 1104 directed upward from the substantially horizontal plane 1108 and towards the interior of the perimeter 1110 of the basket 626. In some examples, the FOVs 1106 may include an area above the top 1110 of the cart 1100, an area within the basket 626 of the cart, and/or a combination of above and below the top 1100 of the basket 626.

FIG. 11B illustrates an example top view of an item-identifying cart 1100 that has imaging devices 634(2)-(N) for identifying items 606 placed in the cart 1100. As illustrated, the cart 1100 is shown from a top such that the dimensions of the cart 1100 are illustrated along an x-axis and a z-axis (x-z coordinate plane).

In some examples, four imaging devices 634 are positioned at four different corners of the frame 624 and/or basket 626 of the cart 1100. Each of the four imaging devices 634 may include respective optical axes 1118 directed inward relative to the perimeter 1110 of the basket 626. Additionally, the four imaging devices 634(2)-(N) may each have FOVs ($\theta_{x,z}$) 1120 that are defined according to the optical axes 1118 (e.g., the optical axes 1118 may be approximately the middle of the FOVs 1120). The FOVs 1120 may be any FOV for cameras in the imaging devices (e.g., 80 degrees, 70 degrees, 45 degrees, etc.). Generally, the FOVs 1120 for each of imaging devices 634 may overlap at least partially at a centroid 1122 of the frame 624 and/or basket 626 of the cart 1100. The FOVs 1120 may, in combination, cover all, or most, of the interior of the perimeter 1110 of the basket 626 such that items 606 are detected and identified using at least one of the capture assemblies 634.

Figure 11D:
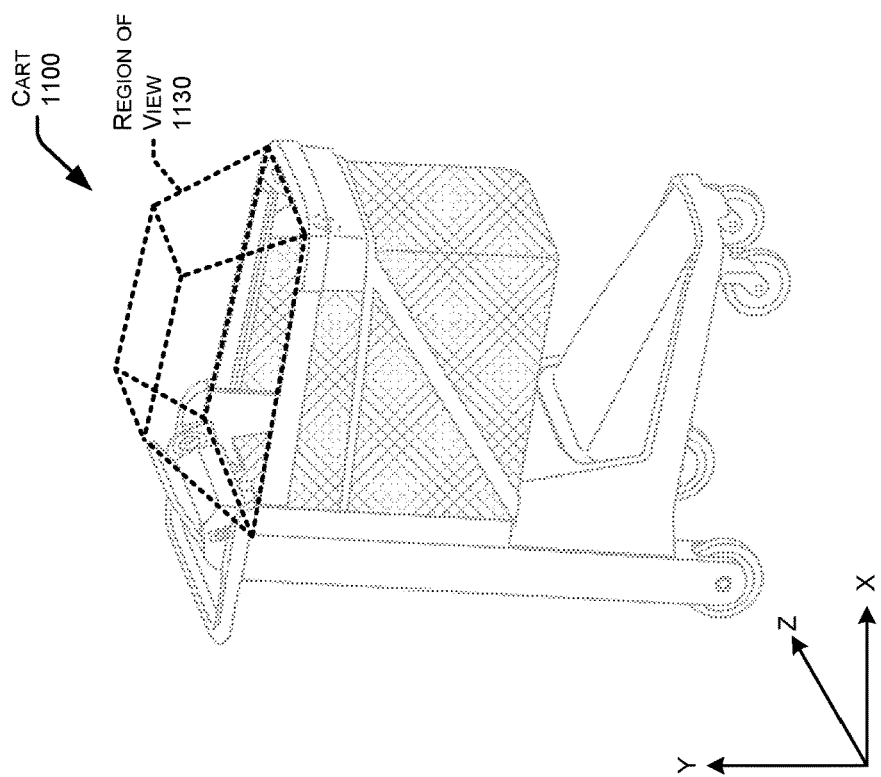
Figure 11C:
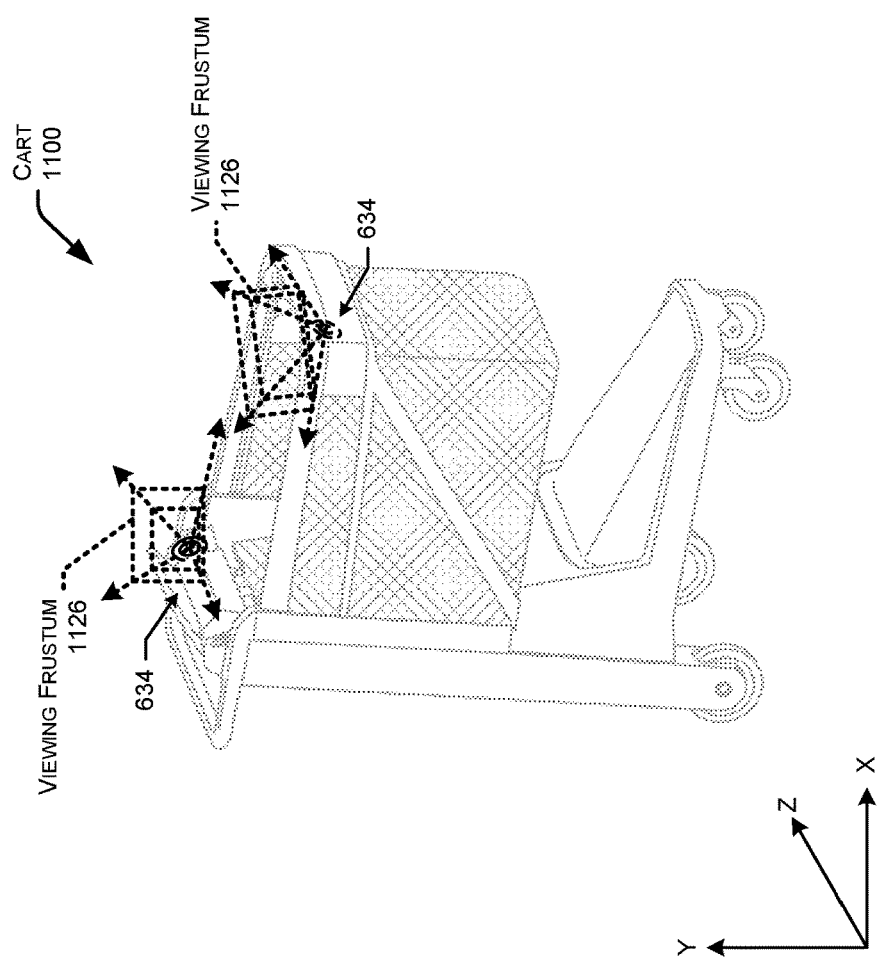

FIG. 11C illustrates an example perspective view of an item-identifying cart 1100 that has imaging devices 634 for identifying items 606 placed into the cart 1100. As illustrated, the cart 1100 may include multiple imaging devices that have viewing frustums 1126 that may be oriented in the same direction as the optical axis 1104. The viewing frustums 1126 may generally be the region of space in the environment of the cart 1100 that is within the field of view of the camera and/or proximity sensor of the imaging devices 634. The viewing frustums 1126 for each of the imaging devices 634 may be oriented inward to the basket 626 of the cart, and upward relative to the top, or perimeter, of the basket 1110. The proximity sensor, if present, and imaging devices may have the same viewing frustum 1126, or different viewing frustum's 1126 that at least partially overlap.

FIG. 11D illustrates another example perspective view of an item-identifying cart 1100 that has imaging devices 634 for identifying items 606 placed into the cart 1100. As shown in FIG. 11D, the viewing frustums 1126 and/or FOV's 1106 for each of the imaging devices 634 may generally define a region of view 1130. The region of view 1130 may comprise a volumetric, three-dimensional (3D) shape in which items 606 are captured in image data of the cameras, and/or detected by proximity sensors. Thus, the region of view 1130 defines a volumetric region in which at least one of the cameras in a capture assembly is able to capture image data representing an item 606. Generally, the region of view 1130 may encompass substantially all, or a large majority of, the perimeter of the top of the basket 1110. In this way, items 606 placed in the basket 626 will be detected and have image data generated that represents the items 606 as they are being placed in the basket 626. Although illustrated as including space above the basket 626, in some examples, the region of view 1130 may additionally, or alternatively, include space inside the basket 626 (e.g., downward facing cameras). In some instances, the region of view 1130 defined by the cameras on the cart 604 may be the same as the region of view 1130 of the proximity sensors, or different than the region of view 1130 of the proximity sensors.

Figure 12:
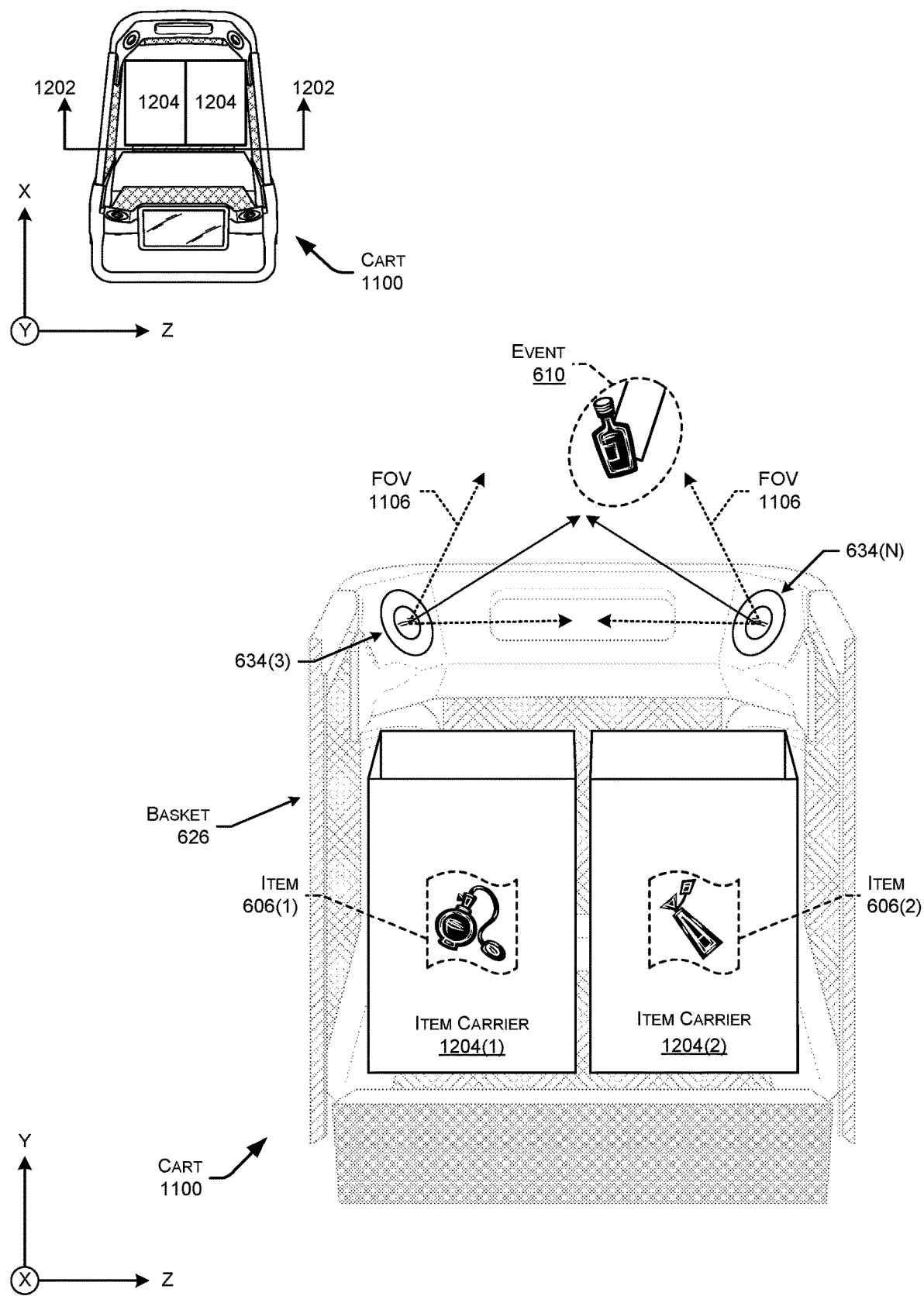
FIG. 12 illustrates another example cross-sectional view of an item-identifying cart that has item carriers placed inside the basket of the cart, and cameras that are used to identify an item being placed in the item carriers.

FIG. 12 illustrates another example of an item-identifying cart 1100, including a top view and a cross sectional view, that has item carriers 1204 placed inside the basket of the cart 1100, and imaging devices 634 and light sources 702 (within respective capture assemblies) that are used to identify an item being placed in the item carriers 1204.

As illustrated by the top view; the cart 1100 may include a basket that is sized to store one or more item carriers 1204, such as bags (e.g., plastic bags, paper bags, etc.), boxes, user-provided item carrier, and/or any other item carrier 604. In some examples, the cart 1100 may have a basket 626 that is sized to efficiently fit (e.g., minimize empty space in the basket 626) one or more of the item carriers 1204. As shown in the cross-sectional view of the basket 626 of the cart, the item carriers 1204 may be sized such that the tops of the item carriers 1204(1) and 1204(2) are below the perimeter defining the top of the basket 626. In this way, the FOVs of the imaging devices 634 are not obstructed by the item carriers 1204.

As shown, the item carriers 1204 may have items 606 stored therein, which are no longer visible to cameras due to their placement in the item carriers 1204. Accordingly, if the imaging devices 634 had FOVs 1106 that generated image data of the interior of the basket 626, the items 606 may not be visible due to occlusion from the item carriers 1204. However, to identify the items 606 placed in a cart 1100, the imaging devices 634 need to be able to view the items 606, which would prevent users 608 from being able to place item carriers 1204 in their carts 604. Thus, by having FOVs 1106 that at least partly face upward relative to the top of the perimeter of the basket 626, the items 606 that are placed in the basket are identifiable in image data generated by the imaging devices 634. Additionally, users 608 are able to place their item carriers 1204 directly in the basket 626 to receive items 606 as the user 608 shops, thereby reducing friction in the traditional-checkout experience by having to take items out of the cart 1100 to be bagged or otherwise placed in item carriers 604.

In some examples, the basket 626 (or other location on the cart 1100) may include one or more hooks to help support the item carriers 1204. For instance, the item carriers 1204 may be a cloth, or other material, with handles or holes. To help hold the item carriers 1204 open and/or up, the basket 626 may include hooks near the top or perimeter and/or hooks on the outside of the basket 626 to hook into holes of the item carriers 1204 and/or to hold up handles of the item carriers 1204, such as the bag clips 708(1)-(2) discussed above.

Figure 13:
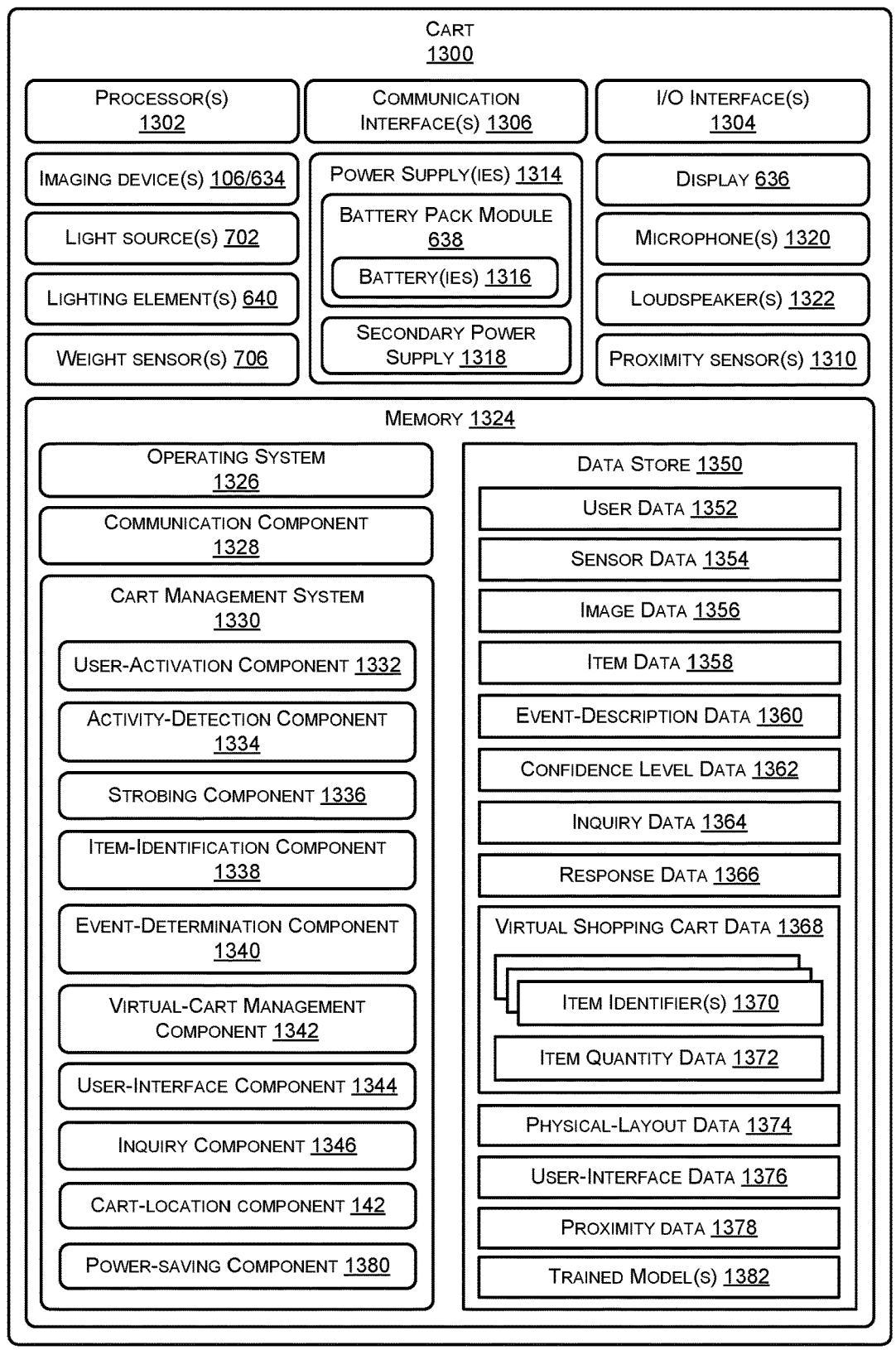
FIG. 13 illustrates example components of a cart configured to support at least a portion of the functionality of a cart management system.

FIG. 13 illustrates example components of an item-identifying cart 1300 configured to support at least a portion of the functionality of a cart management system. In some instances, the cart 1300 may correspond to and/or include some or all of the functionality of the carts 102, 604, 802, and/or 1100.

The cart 1300 may include one or more hardware processors 1302 (processors) configured to execute one or more stored instructions. The processors 1302 may comprise one or more cores. The cart 1300 may include one or more input/output (I/O) interface(s) 1304 to allow the processor 1302 or other portions of the cart 1300 to communicate with other devices. The I/O interfaces 1304 may comprise Inter-Integrated Circuit (I2C), Serial Peripheral Interface bus (SPI), Universal Serial Bus (USB) as promulgated by the USB Implementers Forum, and so forth. The I/O interfaces 1304 may allow the various modules/components to communicate with each other and/or control each other.

The cart 1300 may also include one or more communication interfaces 1306. The communication interfaces 1306 are configured to provide communications between the cart 1300 and other devices, such as the server(s) 620, sensors, interface devices, routers, and so forth. The communication interfaces 1306 may include devices configured to couple to personal area networks (PANs), wired and wireless local area networks (LANs), wired and wireless wide area networks (WANs), and so forth. For example, the communication interfaces 1306 may include devices compatible with Ethernet, Wi-Fi™, and so forth. The cart 1300 may also include one or more busses or other internal communications hardware or software that allow for the transfer of data between the various modules and components of the cart 1300.

The cart 1300 may also include the one or more imaging devices 634, such as the first imaging device 634(1) for identifying a user operating the cart and one or more second imaging devices 634(2)-(N) for identifying items placed into and removed from a basket of the cart. The cart 1300 may further include the light sources 702, the lighting elements 640, and the weight sensors 706 described above.

In some instances, the cart 1300 further includes one or more proximity sensors 1310. The proximity sensors 1310 may comprise any type of sensor that is able to detect the presence of nearby objects without the need for physical contact (e.g., ToF sensors, PIR sensors, infrared sensors, capacitive sensors, ultrasonic sensors, etc.). As described above, each proximity sensor may be configured to output an indication when the respective proximity sensor detects an object within a threshold distance of the sensor. Further, the configured threshold distances may vary from sensor to sensor in order to collectively create a virtual perimeter. Further, in some instances a single proximity sensor may be configured with multiple threshold distances. For instance, in the example of a proximity sensor having 64 diodes, the senor may be effectively split into quadrants of sixteen sensors such that each quadrant is configured to output an indication when an object is detected at a threshold distance that is potentially unique to the other three quadrants. For instance, a distance of a closest object of each diode of the sixteen diodes in a particular quadrant may be averaged and this average distance may be compared to a threshold to determine whether to output an indication that an object has been detected.

The imaging devices, meanwhile, may comprise any type of camera or imaging device configured to generate image data (and/or video data) or information descriptive of a plurality of picture elements or pixels. Additionally, in some instances the cart 1300 may include one or more imaging devices that are outward-facing and that generate image data representing the facility 602 around the cart 1300.

The cart 1300 may include one or more power supply(ies) 1314 to provide power to the components of the cart 1300, such as the battery pack module 738. The power supply(ies) 1314 may also include a secondary (e.g., internal) power supply 1318 to allow for hot swapping of battery pack modules 738, such as one or more capacitors, internal batteries, etc.

The cart 1300 may also include a display 636 configured to display image data, such as pictures, videos, user interface elements, and/or any other image data. The display 636 may comprise any type of display 636, and may further be a touch screen to receive touch input from a user. The cart 1300 may also include one or more microphones 1320 and one or more loudspeakers 1322 to facilitate a dialogue with a user 608, and/or to receive feedback from the user 608. The microphone(s) 1320 may capture sound representing the user's speech, and the loudspeaker(s) 1322 may output machine-generated words to facilitate a dialogue, prompt a user 608 for feedback on an item 606 and/or for other information, and/or output other alerts or notifications.

The cart 1300 may include one or more memories 1324. The memory 1324 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1324 provides storage of computer-readable instructions, data structures, program modules, and other data for the operation of the cart 1300. A few example functional modules are shown stored in the memory 1324, although the same functionality may alternatively be implemented in hardware, firmware, or as a system on a chip (SOC).

The memory 1324 may include at least one operating system (OS) component 1326. The OS component 1326 is configured to manage hardware resource devices such as the I/O interfaces 1304, the communication interfaces 1306, and provide various services to applications or components executing on the processors 1302. The OS component 1326 may implement a variant of the FreeBSD™ operating system as promulgated by the FreeBSD Project: other UNIX™ or UNIX-like variants; a variation of the Linux™ operating system as promulgated by Linus Torvalds: the Windows® Server operating system from Microsoft Corporation of Redmond, Washington, USA; and so forth.

One or more of the following components may also be stored in the memory 1324. These components may be executed as foreground applications, background tasks, daemons, and so forth. A communication component 1328 may be configured to establish communications with one or more of the sensors, one or more of the servers 620, or other devices. The communications may be authenticated, encrypted, and so forth.

The memory 1324 may further store a cart management system 1330. The cart management system 1330 is configured to provide the item-identifying functions (and other functions) provided by the cart 1300 as described herein. For example, the cart management system 1330 may be configured to identify a user operating a cart, identify items 606 placed into the cart, and maintain a virtual shopping cart for a user 608 of the cart 1300. While these components are described as operating on the cart 1300, in some instances some or all of these components reside additionally or alternatively on the servers 620 or elsewhere.

The cart management system 1330 may include a user-activation component 1332 that performs operations for activating a shopping session using a cart 1300 on behalf of a user 608. For instance, a user 608 may have previously registered for a user account with an operator of the facility to utilize various automated management services provided by an operator of the facility 602. The user 608 may have registered for a user account, such as by providing user data 1352, to automate payments made for items taken by the user and included a payment means (e.g., credit card, bank account number, etc.), and may have also provided an identification means in the user data 1352 to the user-activation component 1332 such that the cart 1300 can recognize the user 608. For instance, the user 608 may have registered to identify themselves to the cart 1300 using any identification technique by the user-activation component 1332, such as by providing user data 1352 by presenting an identification means to the first imaging device 634(1) (e.g., presenting a driver's license, presenting a facility-issued card, presenting a user identifier via a mobile phone, etc.), speaking a predefined utterance that is captured by the microphone(s) 1320 (e.g., a name of the user, a predefined keyword, etc.), and/or looking into a camera for facial recognition. Once a user 608 has identified themselves to using the user-activation component 1332, the user-activation component 1332 may open a shopping session where the cart 1300 identifies and track items 606 retrieved by the user 608 and placed in the cart 1300.

The cart management system 1330 may additionally include an activity-detection component 1334 configured to detect items 606 (or objects) within a particular proximity to the cart. For example, one or more proximity sensor(s) 1310 may generate sensor data 1354 that indicates a distance between the proximity sensor(s) 1310 and any objects located in the FOV of the proximity sensor(s). The activity-detection component 1334 may analyze the sensor data 1354 and determine if an object is within a threshold distance indicating that the object is near the cart 1300 and/or within or near the perimeter of the top of the basket 626 of the cart 1300 (e.g., one foot from the proximity sensor(s), two feet from the proximity sensor(s), etc.). In this way, the proximity sensor(s) may generate sensor data 1354 that indicates whether or not an item 606 is being moved in or out of the basket 626 of the cart 1300. However, in some examples, rather than using sensor data 1354 generated by a proximity sensor(s), the activity detection component 1334 may utilize image data 1356 generated by the imaging devices 634(2)-(N) to determine if an object is within a threshold distance from the cart 1300.

The cart management system 1330 may further include a strobing component 1336 configured to cause the light sources 702 and/or shutters of the imaging devices 634 to strobe according to different frequencies. As noted above, the light sources 702 may emit light in any light spectrum (e.g., infrared, near infrared, visible, etc.). However, some items 606 may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the light sources 702 to emit light in the visible spectrum. When generating image data 1356 using the imaging devices 634, motion blur may appear when capturing fact moving objects. However, the motion blur may be reduced or eliminated by exposing the imaging device's imager for a short (e.g., sub-millisecond) durations. Accordingly, the strobing component 1336 may strobe the opening and closing of shutters of the imaging devices 634 to limit the sensor exposure duration. Additionally, the strobing component 1336 may cause the LEDs to emit/strobe light at a particular frequency. In some instances, the strobing component 1336 may cause the LEDs to strobe at a first rate (e.g., 7200 hertz) prior to detecting predefined activity, such as a user placing an item into or removing an item from a cart, while causing the LEDs to strobe at a second, different rate (e.g., 60 hertz) upon identifying the predefined activity. Further, the LEDs may emit light in the visible range in some instances, and in the non-visible range in other instances. In some examples, the LEDs may comprise RGB LEDs that may be mixed according to different respective levels to tune a resulting color of the LEDs.

The cart management system 1330 may also include an item-identification component 1338 configured to analyze image data 1356 to identify an item 606 represented in the image data 1356. The image data 1356 may comprise information descriptive of a plurality of picture elements, or pixels, for one or more image frames (e.g., a still picture, multiple picture frames, video frames, etc.). The item-identification component 1338 may analyze the image data 1356 using various image processing techniques, or computer vision techniques. For instance, the item-identification component 1338 may extract a representation of an item 606 depicted in the image data 1356 generated by at least one imaging device 634. The representation may include identifying text printed on the item 606, colors or color schemes printed in the item, determining 2-D and/or 3D shapes of the items 606, and/or other techniques for extract a representation of the item 606. In some instances, the representation of the item 606 depicted in the image data 1356 may comprise a numeric representation, such as a feature vector or a set of feature vectors.

In some examples, a data store 1350 stored in the memory 1324 may include item data 1358, which may include representations of the items 606 offered for acquisition at the facility 602. The item-identification component 1338 may compare the extracted represented of the item 606 with the "gallery" or stored representations of the known items 606 in the item data 1358. In some instance, the item representation may include an indication of a barcode or SKU data for the item 606 as recognized in, or extracted from, the image data 1356. The item-identification component 1338 may determine confidence level data 1362 based on the comparisons with item representation in the item data 1358. The item-identification component 1338 may determine, and assign, confidence levels indicating how likely it is that the item 606 represented in the image data 1356 corresponds to an item from the item gallery in the item data 1358. Based on the confidence level data 1362, the item-identification component 1338 may determine an item identifier 1370 for the item in the image data 1356 (or multiple item identifiers 1370) that corresponds to an item in the item data 1358 to which the item 606 corresponds.

In some examples, the data store 1350 may include physical-layout data 1374 that is used by the item-identification component 1338 to determine the item 606. The physical-layout data 1374 may include or provide a mapping of physical locations within the physical layout of devices and objects such that the location of the cart 1300 may be utilized to determine an item 606 stored nearby. The physical-layout data 1374 may indicate the coordinates within the facility 602 of an inventory location 612, items 606 stored at that inventory location 612, and so forth. In examples where the cart 1300 has location determining sensors (e.g., GPS, RFID, proximity, etc.), the location sensor data may be used to determine where in the store the user 608 is. In such examples, the item-identification component 1338 may access the physical-layout data 1374 to determine if a location associated with the event is associated with items 606, and confidence levels for the corresponding representations of items in the item data 1358. Continuing the example above, given the location within the facility 602 of the event and image camera data, the physical-layout data 1374 may determine the items 606 that may have been represented in generated images of the event 610.

The cart management system 1330 may further include an event-determination component 1340 to determine event-description data 1360 for the item 606 in the image data 1356. The event-determination component 1340 may determine if the user 608 is adding an item 606 to the cart 1300, removing the item from the cart 1300, etc., based on movement of the item 606 and/or whether the item is shown in the image data 1356. For instance, if the item 606 is shown as being moved downward towards the interior of the cart 1300, and the user's hand then leaves the basket without the item 606, it can be determined that the user 608 added the item 606 to the cart 1300. Similarly, if the user's hand 608 moves into the cart without an item 606 and is depicted in the image data 1356 taking an item 606 from the cart, the event-determination component 1340 may determine that the user 608 removed an item 606 from the cart 1300.

The cart management system 1330 may also include a virtual-cart management component 1342 configured to manage virtual shopping cart data 1368 for the cart 1300. For instance, the virtual-cart management component 1342 may utilize the item data 1358, event-description data 1360, and confidence level data 1362 to add item identifier(s) 1370 to the virtual shopping cart data 1368 for items 606 that were added to the cart 1300, remove item identifier(s) 1370 from the virtual shopping cart data 1368 for items 606 that were removed from the cart 1300, and track item quantity data 1372 indicating quantities of particular items 606 in the cart 1300.

The cart management system 1330 may further include a user-interface component 1344 configured to present user interfaces on the display 636 based on user-interface data 1376. The user interfaces 1376 may include one or more fields to present data, and/or receive touch input (or other input via a keyboard, mouse, etc.) from a user 608. For instance, if the item-identification component 1338 is unable to determine an item identifier 1370 for an item 606 shown in the image data 1356, the user-interface component 1344 may receive inquiry data 1364 generated by an inquiry component 1346 to prompt a user 608 for feedback to help identify the item 606, and/or other information (e.g., if multiple items were placed in the cart 1300). The inquiry component 1346 may be configured to generate inquiry data 1364 based on the information needed to identify the item 606. For instance, the inquiry data 1364 may include a prompt to request particular feedback from the user 608, such as to provide input (e.g., touch input, vocal/utterance input, etc.) to identify the item 606, input to indicate how many items 606 were added to the cart, input to indicate whether an item 606 was removed or added, etc. In some examples, the user-interface component 1344 may present one or more images depicting items from the item data 1358 that have the highest confidence levels as corresponding to the item 606 in the image data 1356, but confidence levels that are not high enough to make a final decision as to the item 606. For instance, the user-interface component 1344 may present pictures of two different items that have high confidence levels 1362 and request that the user 608 select or indicate the appropriate item 606. Additionally, or alternatively, the user-interface component 1344 may present user-interface data 1376 that prompts the user for feedback regarding whether or not the item 606 was added to, or removed from the cart 1300.

In some examples, the cart management system 1330 may further include the cart-location component 142 configured to determine locations of the cart 1300 in the facility 602. For instance, the cart-location component 142 may analyze sensor data 1354 collected by sensors of the cart 1300 to determine a location, using the techniques described above or otherwise. In some examples, the communication interface(s) 1306 may include network interfaces that configured the cart 1300 to receive or detect wireless signals (e.g., WiFi signals, Bluetooth signals, etc.) and generate sensor data 1354 indicative of the signals. In addition to the techniques above, the cart-location component 142 may analyze the sensor data 1354 using various techniques to identify the location of the cart 1300, such as WiFi triangulation, received signal strength indicators (RSSI), and/or other methods for analyzing wireless signals to determine a location of the cart 1300. In some instances, the facility 602 may include various infrared (IR) or near-IR emitters at different locations that emit light according to frequencies, patterns, etc. that indicate the different locations in the facility 602. In such examples, the cart 1300 may include a light sensor to generate the sensor data 1354 representing the IR or NIR and determine the location of the cart 1300 in the facility. In some instances, there may be visible landmarks or markers throughout the facility that indicate a location in the facility, and the cart-location component 142 may analyze image data 1356 generated by an outward facing camera to determine a location of the cart 1300. As another example, there may be various radio frequency (RF) emitters positioned throughout the store, and the cart 1300 may include an RF receiver to allow the cart-location component 142 to perform IR beaconing to determine the location of the cart 1300. The cart-location component 142 may perform one, or any combination, of the above techniques to determine a location of the cart 1300 in the facility and/or any other technique known in the art.

The cart-location component 142 may perform various operations based on determining the location of the cart 1300 within the facility 602. For instance, the cart-location component 142 may cause user interface data 1376 to be presented on the display 636 that includes a map of the facility 602 and/or directions to an item 606 for the user of the cart 1300. Additionally, or alternatively, the cart-location component 142 may utilize the location of the cart, the physical-layout data 1374, and/or item data 1358 and "push" user interfaces to the display 636 that indicate various location-based information, such as indications of deals for items 606 located nearby, indications of items 606 located nearby and on the user's shopping list, and/or other user interface data 1376.

In some examples, the cart management system 1330 may further a power-saving component 1380 configured to selectively power off or down one or more components of the cart 1300 when the cart 1300 determines that no users are within a threshold distance of the cart 1300.

For example, the power-saving component 1380 may be configured to determine when a user is not within a threshold distance and, in response, may instruct one or more components of the cart 1300 to power off or otherwise lessen the power the components consume from the batter (ies) 1316. For example, the power-saving component may instruct the item-identification component 1338 and/or the event-determination component 1340 to stop performing image-processing on the image data 1356 generated by the imaging devices 634 or may instruct these components to perform the image-processing at a lesser frame rate. Additionally, or alternatively, the power-saving component may instruct the user-activation component 1332 or the activity-detection component 1334 to refrain from performing image-processing on the image data 1356 or lessen the frame rate at which these components perform the image-processing. In addition, or in the alternative, the power-saving component 1380 may instruct any of the other components of the cart management system 1330 to power off or down in order to consume less power in response to determining that a user is not within the threshold distance of the cart 1300, and/or may instruct any other software and/or firmware components of the cart 1300 to power off or down in response.

In addition, or in the alternative, the power-saving component 1380 may instruct one or more hardware components of the cart 1300 to power off or down in response to determining that a user is not within the threshold distance of the cart 1300. For instance, the power-saving component 1380 may instruct the imaging devices 634 to power off or lessen a frame rate at which the imaging components 634 generate the image data. Additionally, or alternatively, the power-saving component 1380 may instruct the display 636 to power off (or dim its brightness) and/or may instruct the light sources 702, lighting elements 640, weight sensors 706 (and/or weight-sensing firmware/software), the communication interfaces 1306. I/O interfaces 1304, the microphones 1320, the loudspeakers 1322, and/or any other hardware component of the cart 1300 to power off or otherwise consume less power from the batter (ies) 1316. Furthermore, in addition to power off or down any of these software, firmware, and/or hardware components of the cart 1300, the power-saving component 1380 may be configured to power on or up each of these components in response to determining that a user is within the threshold distance of the cart 1300 (e.g., within the example virtual perimeter 308).

The power-saving component 1380 may determining whether a user is within the threshold distance of the cart 1300 based on proximity data 1378 generated by the proximity sensors 1310. For instance, the power-saving component 1380 may receive the proximity data 1378 and analyze the proximity data to determine whether a user is within the threshold distance. In some instances, the proximity data 1378 indicates, for each sensor or quadrant (or the like) of a sensor, the distance to a closest user or other object. Thus, the power-saving component 1380 may determine whether the closest user/object is within the threshold distance and, if not, may send the instruction(s) for causing the component(s) to lessen their consumed power. Further, in some instances, the power-saving component 1380 may input the proximity data 1378 and/or additional sensor data generated at the same/similar time as the subject proximity data (e.g., image data 1356, accelerometer data, etc.) into one or more trained models 1382 for determining whether or not the object within the threshold distance of the cart corresponds to a user. If the trained model indicates that the object (or each object) detected by the proximity sensors 1310 does not correspond to a user, but rather an inanimate object (e.g., a rack in the facility), then the power-saving component 1380 may send the instruction(s) to lessen power consumed by the component(s) even if one or more (non-user) objects are detected within the threshold distance of the cart. It is to be appreciated that the trained model(s) may be trained by inputting training data in the form of labelled results (user, no user) and corresponding sensor data into the model during the training process. Of course, while one example is provided, the model(s) 1382 may be trained in any other manner.

In addition, while the above example describes the proximity sensors 1310 outputting proximity data 1378 indicating the distance to a nearest object, in some instances the proximity sensors may output an indication when an object is within a threshold distance but not otherwise. For instance, a first proximity sensor may be configured to output an indication in response to detecting an object within one foot, while another proximity sensor (or quadrant of the same proximity sensor) may be configured to output an indication in response to detecting an object within two feet. Thus, these proximity sensors may output the respective indications in response to detecting an object within their respective threshold distances, but otherwise may refrain from outputting data to the power-saving component 1380. Thus, the power-saving component 1380 may cause the component(s) to power off and/or down based on not receiving an indication of an object within a threshold distance from the proximity sensors 1310 for a threshold amount of time. In addition, the power-saving component 1380 may cause the component(s) to power off and/or down in response to receiving an indication that each object detected by a proximity sensor 1310 within a threshold distance within a certain amount of time does not correspond to a user, as determined by the trained model(s) 1382.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A mobile cart comprising:
   one or more cameras;
   one or more processors; and
   one or more computer-readable media storing computer-executable instructions that, when executed, cause the one or more processors to perform acts comprising:
      receiving image data generated by the one or more cameras, the image data representing one or more items in a facility;
      analyzing the image data using a first classifier to determine first classification data associated with the one or more items;
      analyzing the image data using a second classifier that is different than the first classifier to determine second classification data associated with the one or more items;
      determining, based at least in part on the first classification data and the second classification data, a first item category represented by the image data and of multiple item categories in the facility;
      determining, based at least in part on the first item category represented by the image data, a location of the first item category;
      determining a location of the mobile cart in the facility based at least in part on the location of the first item category, wherein the location of the mobile cart is proximate to the location of the first item category; and
      performing an action associated with the mobile cart based at least in part on the location of the mobile cart.

2. The mobile cart as recited in claim 1, wherein the determining the location comprises determining a section of multiple sections of the facility in which the mobile cart currently resides.

3. The mobile cart as recited in claim 1, wherein the first classifier comprises a classifier that is trained to generate feature data associated with respective portions of the image data and output an item category associated with each respective portion of the image data based at least in part on the feature data.

4. The mobile cart as recited in claim 1, wherein the second classifier comprises a classifier that is trained to receive text data represented in respective portions of the image data and output an item category associated with each respective portion of the image data based at least in part on the text data.

5. The mobile cart as recited in claim 1, wherein:
the analyzing the image data using the first classifier comprises receiving, as output of the first classifier, a first indication of an item category associated with a first item represented in a portion of the image data;
the first classification data includes at least the first indication of the item category;
the analyzing the image data using the second classifier comprises receiving, as output of the second classifier, a second indication of an item category associated with text printed on a second item represented in the image data; and
the second classification data includes at least the second indication of the item category.

6. The mobile cart as recited in claim 1, wherein:
the first classification data indicates that the one or more items correspond to the first item category of multiple item categories in the facility; and
the second classification data indicates that the one or more items correspond to the first item category.

7. The mobile cart as recited in claim 1, wherein:
the analyzing the image data using the first classifier comprises receiving, as output of the first classifier: (i) an indication of a number of portions within the image data that correspond to a respective item; and (ii) an item classification associated with each respective item, the first classification data being based at least in part on the item classification associated with each respective item; and
the determining comprises determining the location of the mobile cart in the facility based at least in part on the first classification data, the second classification data, and the indication of the number of portions within the image data that correspond to a respective item.

8. The mobile cart as recited in claim 1, wherein:
the analyzing the image data using the second classifier comprises analyzing the image data using the second classifier to determine: (i) a number of words within a first portion of the image data that corresponds to a first item of the one or more items; and (ii) a first item classification associated with the first item, the second classification data being based at least in part on the first item classification; and
the determining comprises determining the location of the mobile cart in the facility based at least in part on the first classification data, the second classification data, and the number of words.

9. A method comprising:
receiving image data generated by one or more cameras, the image data representing one or more items in a facility;
analyzing the image data using a first classifier to determine first classification data associated with the one or more items;
analyzing the image data using a second classifier that is different than the first classifier to determine second classification data associated with the one or more items;
determining, based at least in part on the first classification data and the second classification data, a first item category represented by the image data and of multiple item categories in the facility;
determining, based at least in part on the first item category represented by the image data, a location of the first item category;
determining a location of a mobile cart in the facility based at least in part on the location of the first item category, wherein the location of the mobile cart is proximate to the location of the first item category; and
performing an action associated with the mobile cart based at least in part on the location of the mobile cart.

10. The method as recited in claim 9, wherein the determining the location comprises determining a section of multiple sections of the facility in which the mobile cart currently resides.

11. The method as recited in claim 9, wherein the first classifier comprises a classifier that is trained to generate feature data associated with respective portions of the image data and output an item category associated with each respective portion of the image data based at least in part on the feature data.

12. The method as recited in claim 9, wherein the second classifier comprises a classifier that is trained to receive text data represented in respective portions of the image data and output an item category associated with each respective portion of the image data based at least in part on the text data.

13. The method as recited in claim 9, wherein:
the analyzing the image data using the first classifier comprises receiving, as output of the first classifier, a first indication of an item category associated with a first item represented in a portion of the image data;
the first classification data includes at least the first indication of the item category;
the analyzing the image data using the second classifier comprises receiving, as output of the second classifier, a second indication of an item category associated with text printed on a second item represented in the image data; and
the second classification data includes at least the second indication of the item category.

14. The method as recited in claim 9, wherein:
the first classification data indicates that the one or more items correspond to the first item category of multiple item categories in the facility; and
the second classification data indicates that the one or more items correspond to the first item category.

15. The method as recited in claim 9, wherein:
the analyzing the image data using the first classifier comprises receiving, as output of the first classifier: (i) an indication of a number of portions within the image data that correspond to a respective item; and (ii) an item classification associated with each respective item, the first classification data being based at least in part on the item classification associated with each respective item; and
the determining comprises determining the location in the facility based at least in part on the first classification data, the second classification data, and the indication of the number of portions within the image data that correspond to a respective item.

16. The method as recited in claim 9, wherein:
the analyzing the image data using the second classifier comprises analyzing the image data using the second classifier to determine: (i) a number of words within a first portion of the image data that corresponds to a first item of the one or more items; and (ii) a first item classification associated with the first item, the second classification data being based at least in part on the first item classification; and the determining comprises determining the location in the facility based at least in part on the first classification data, the second classification data, and the number of words.

\* \* \* \* \*